United States Patent [19]

Kasai et al.

[11] Patent Number: 5,073,142
[45] Date of Patent: Dec. 17, 1991

[54] METHOD AND APPARATUS FOR SUSPENDING CASING PRODUCTS FILLED WITH MATERIAL

[75] Inventors: Minoru Kasai, Ebina; Minoru Nakamura, Tokyo, both of Japan

[73] Assignee: Hitec Co., Ltd., Tokyo, Japan

[21] Appl. No.: 512,209

[22] Filed: Apr. 20, 1990

[30] Foreign Application Priority Data

Apr. 22, 1989 [JP] Japan .................................. 1-103106
Feb. 16, 1990 [JP] Japan .................................. 2-33668

[51] Int. Cl.$^5$ ............................................. B65G 37/00
[52] U.S. Cl. ......................................... 452/51; 452/46
[58] Field of Search .................... 17/1 F, 24, 34, 44.2, 17/44.3, 44.4, 4.4; 452/51, 46, 49

[56] References Cited

U.S. PATENT DOCUMENTS

| | | | |
|---|---|---|---|
| 4,494,276 | 1/1985 | Trottman | 17/44.4 |
| 4,547,931 | 10/1985 | Staudenrausch et al. | 17/44.4 |
| 4,682,385 | 7/1987 | Kasai et al. | 17/1 F |
| 4,880,105 | 11/1989 | Kasai et al. | 198/465.4 |

FOREIGN PATENT DOCUMENTS 2744350 1/1977 Fed. Rep. of Germany ....... 17/44.4
3635412 4/1987 Fed. Rep. of Germany .......... 17/24

Primary Examiner—Willis Little
Attorney, Agent, or Firm—Wegner, Cantor, Mueller & Player

[57] ABSTRACT

Disclosed are a method and an apparatus for suspending a chain of sausages or the like sequentially in the form of loops from moving hooks. The apparatus for implementing the method includes a supplying device for supplying the product in a longitudinal direction thereof; a conveyor having a plurality of hooks adapted to move toward a path of the product in such a manner that a plane of movement of the hook at a position of intersection with the path of the product includes a horizontal component; and a hampering member or a rectifying device. The hampering member is located forwardly of the path of the product in the moving direction of the hook and adapted to press the product in cooperation with the hook. The rectifying device is located downstream of the supplying device and adapted to guide the product supplied by the supplying device toward the conveyor. The products of varying sizes and link lengths are suspended on the hooks securely and stably even when supplied at high speed.

18 Claims, 16 Drawing Sheets

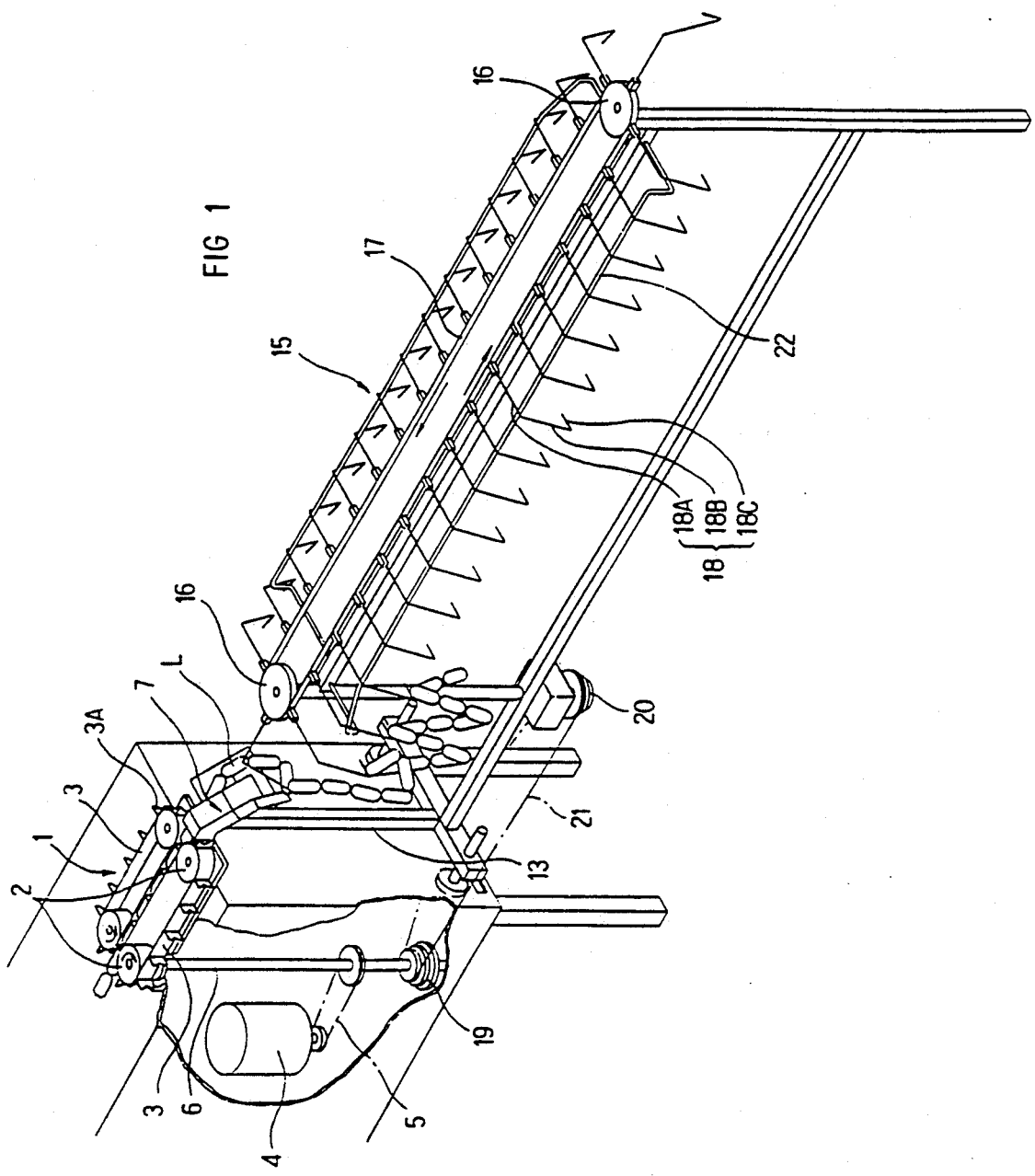

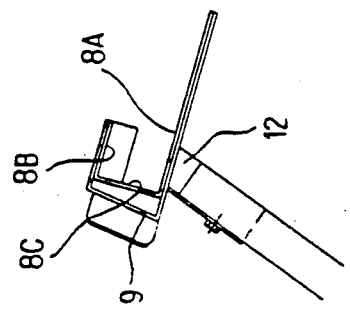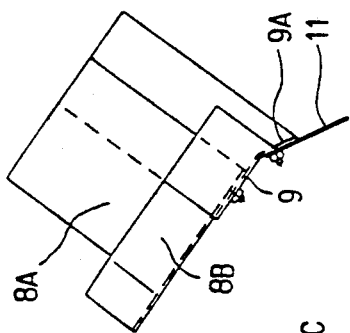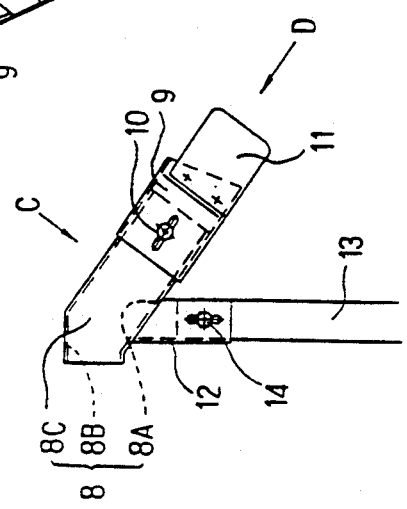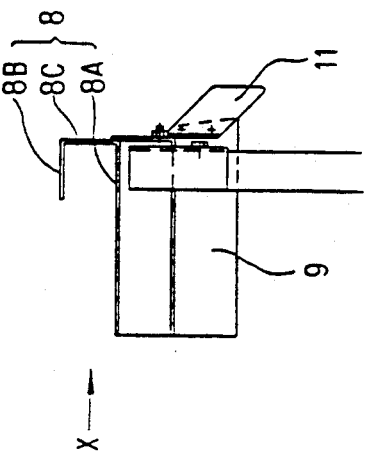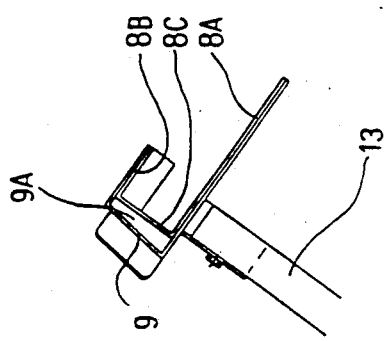

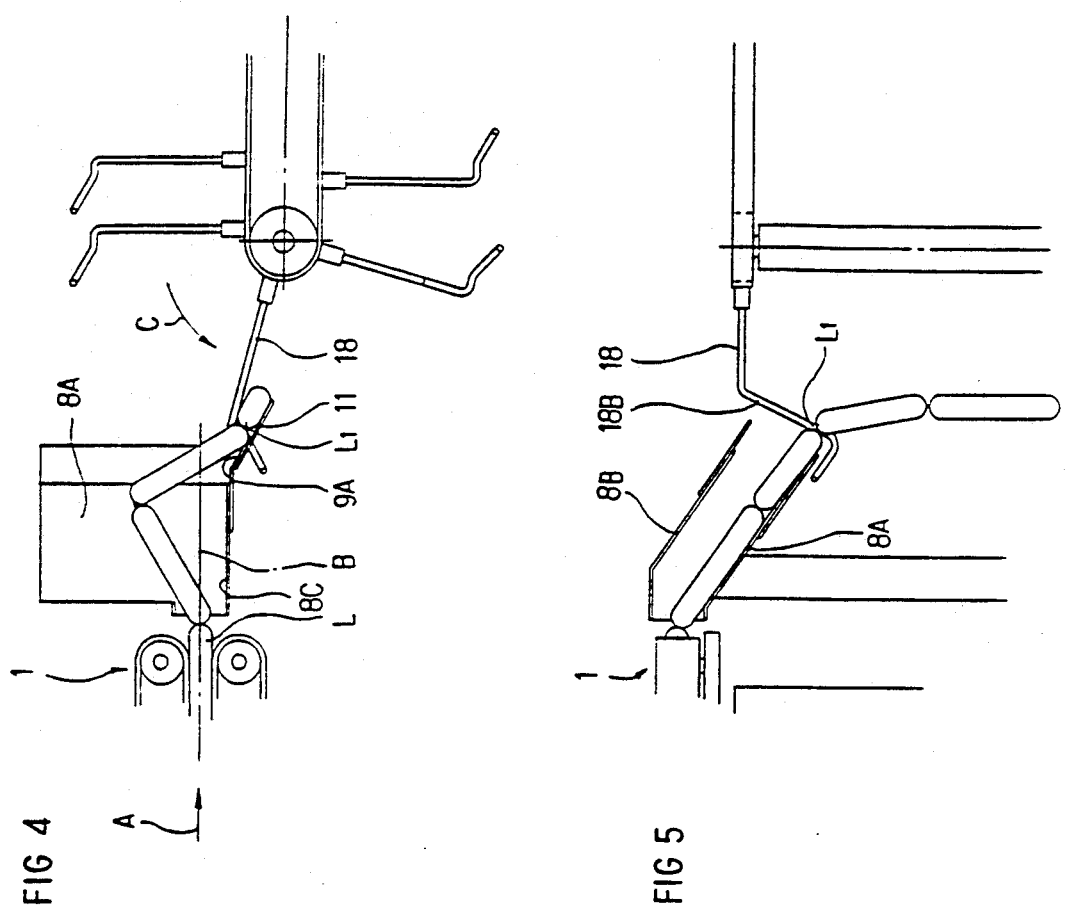

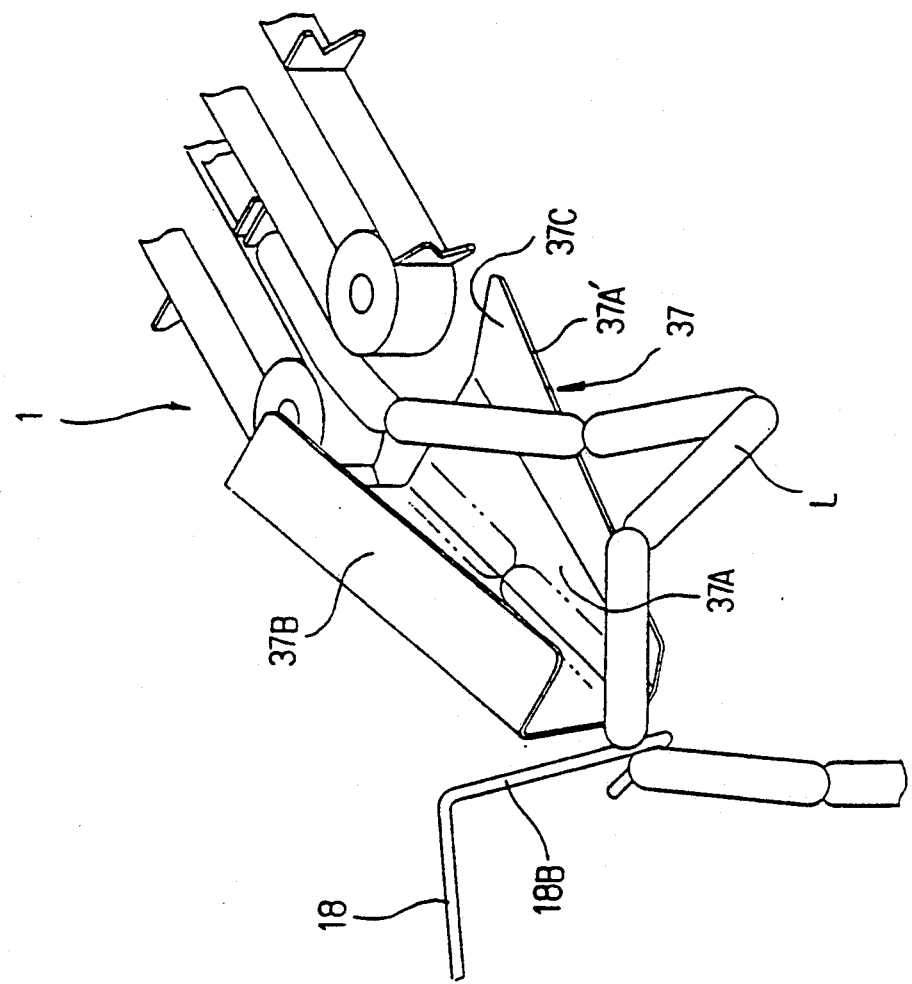

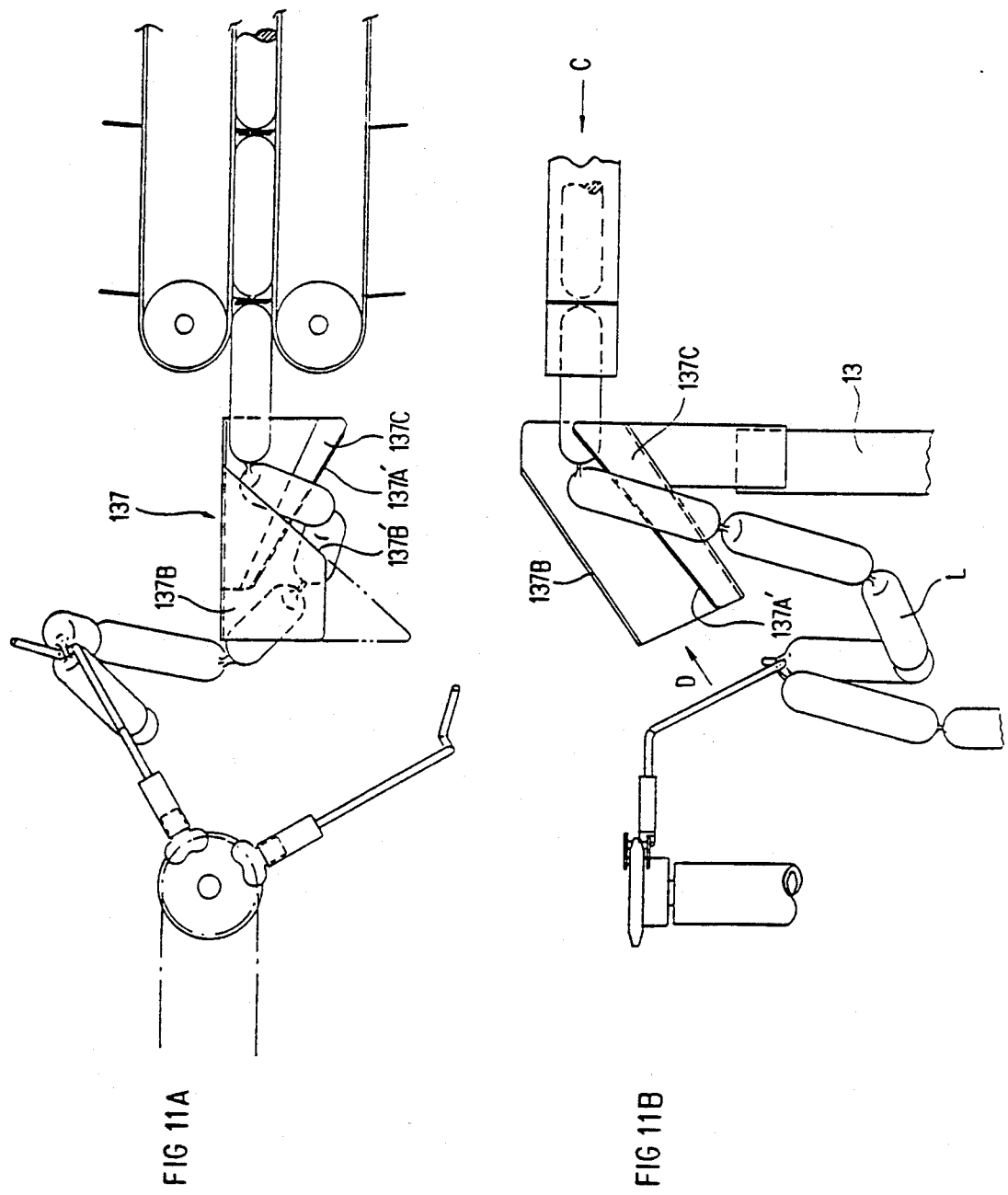

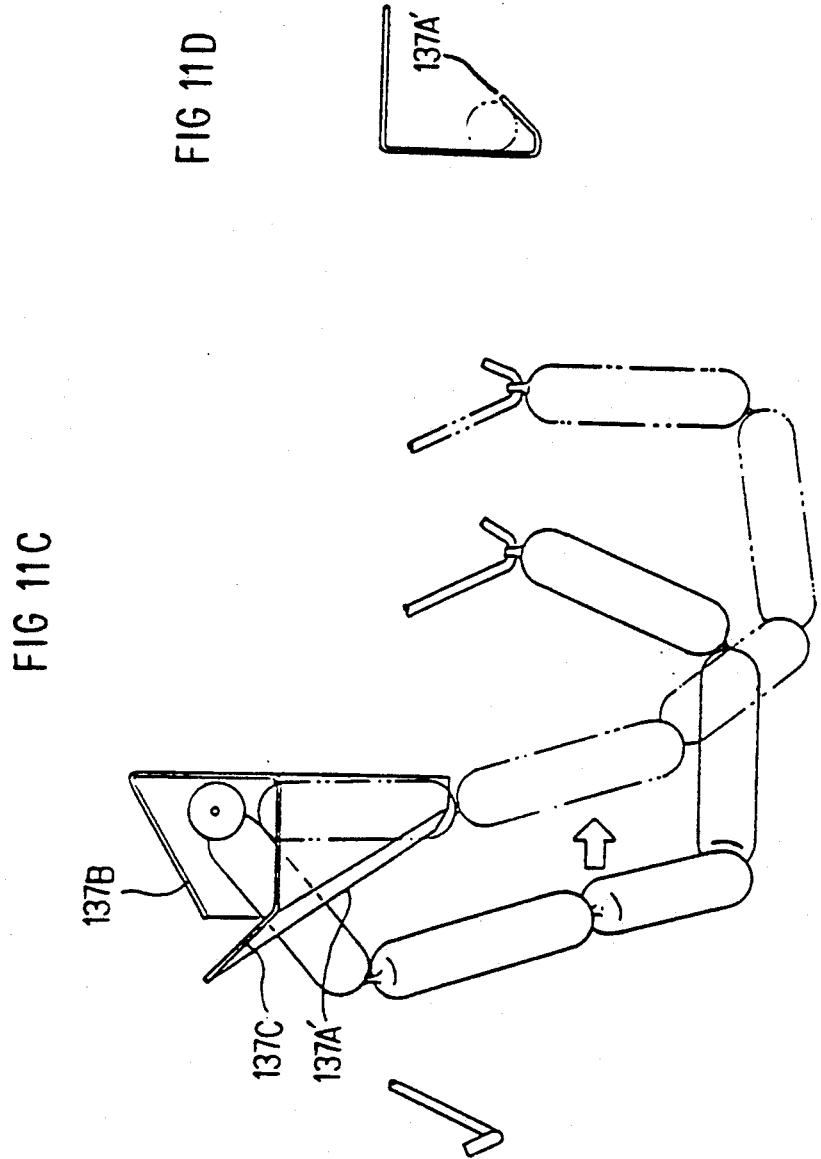

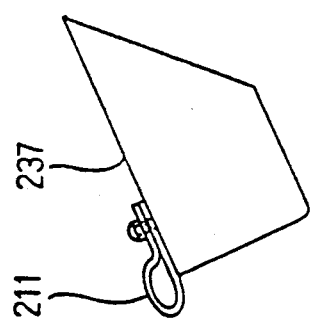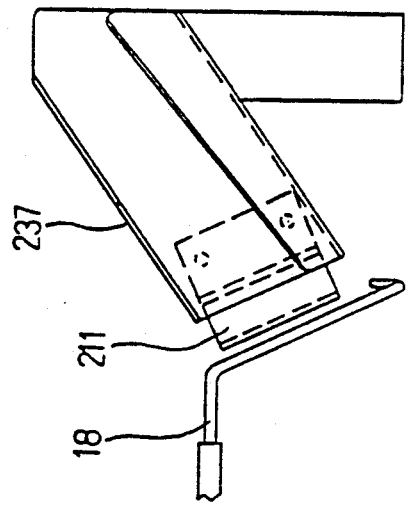
FIG 12A
FIG 12B

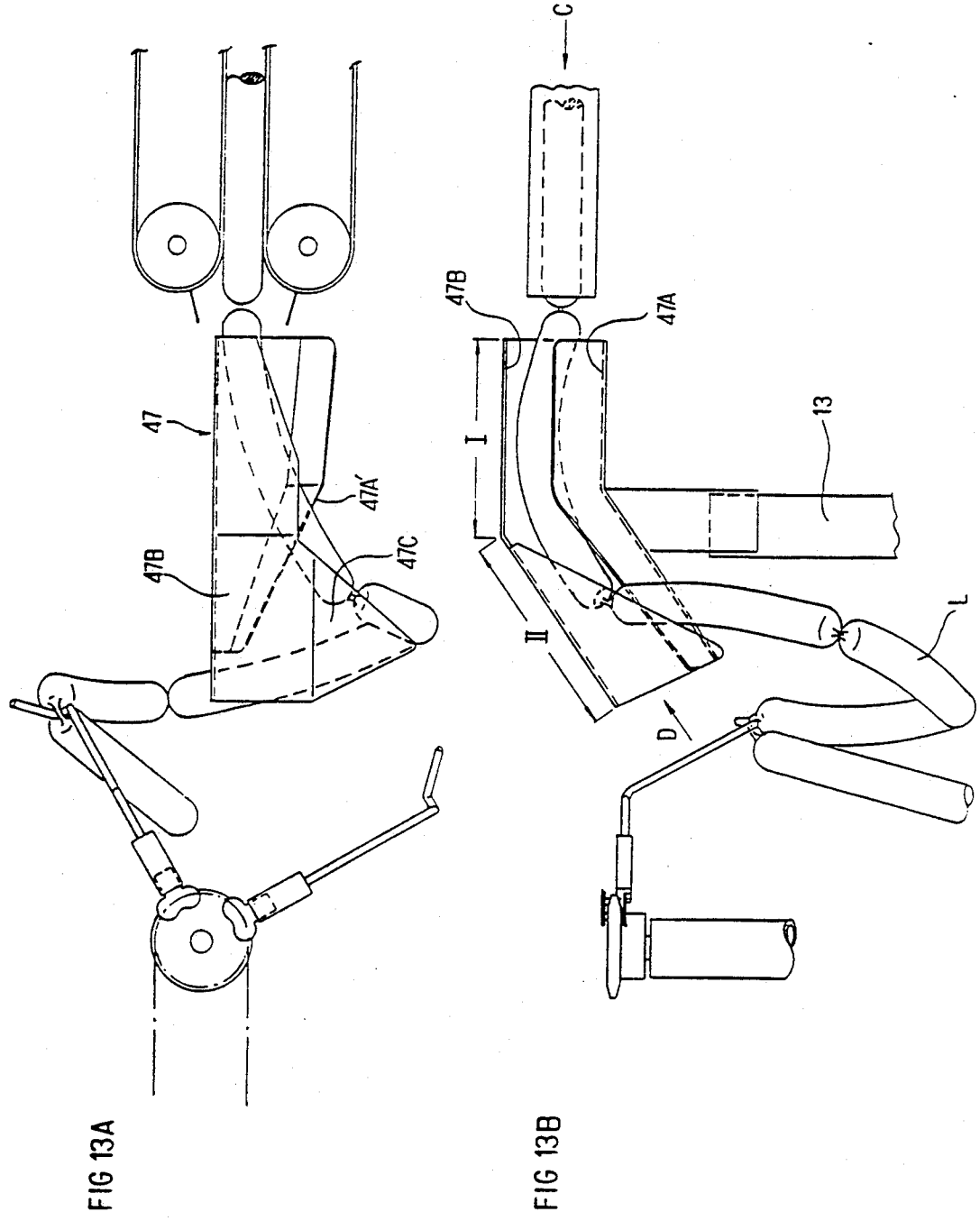

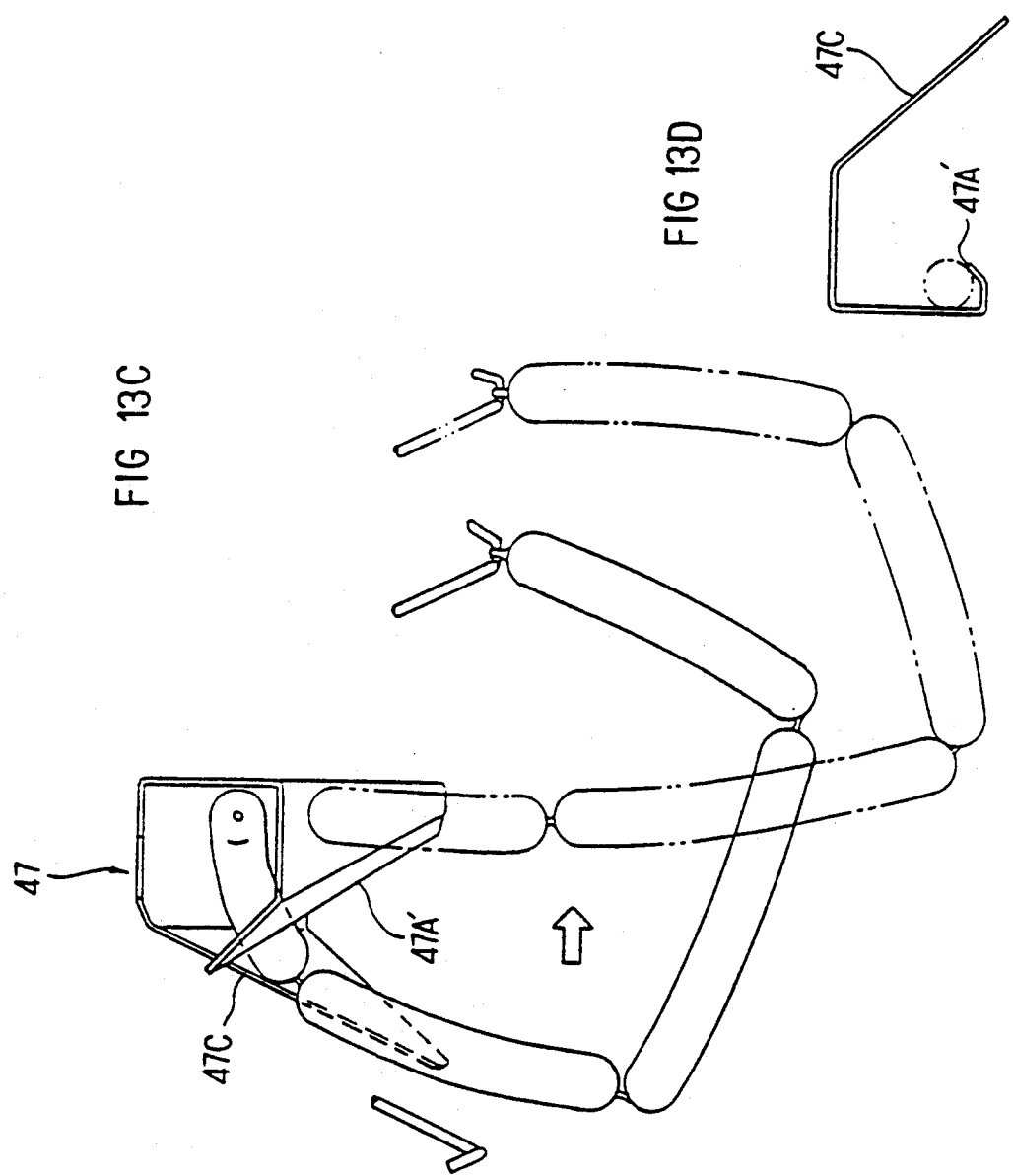

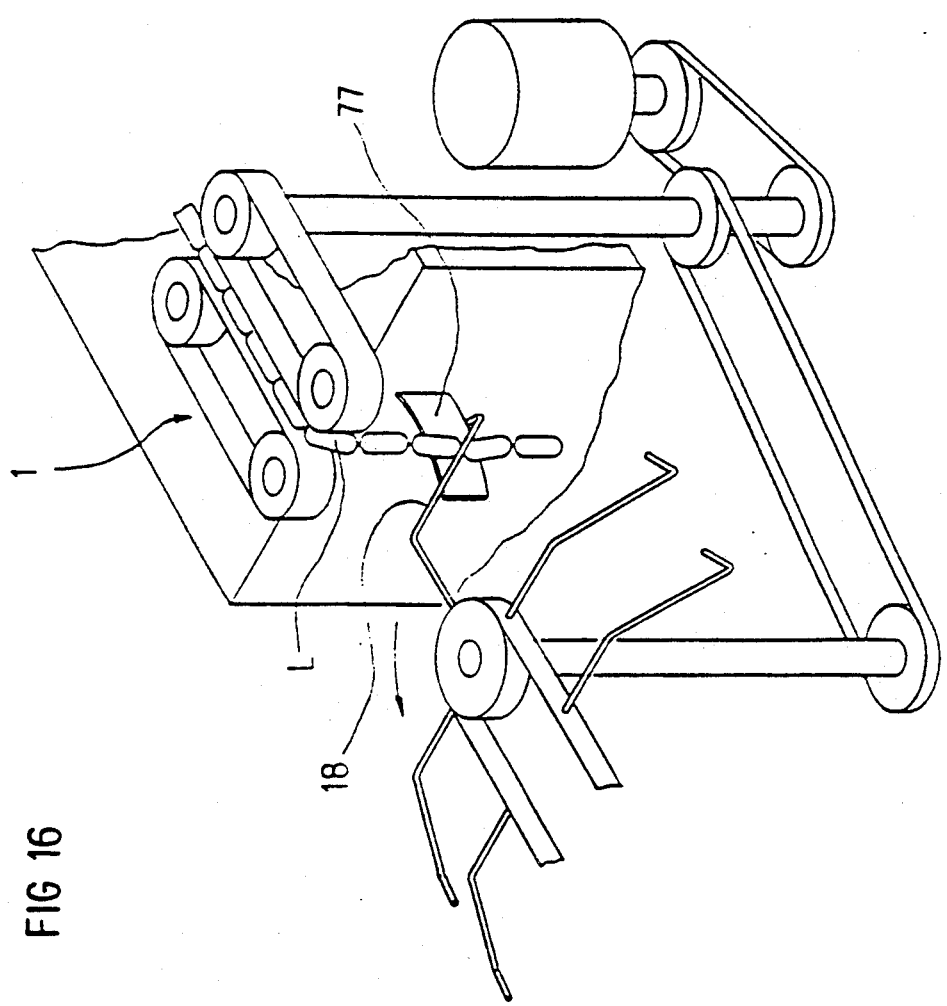

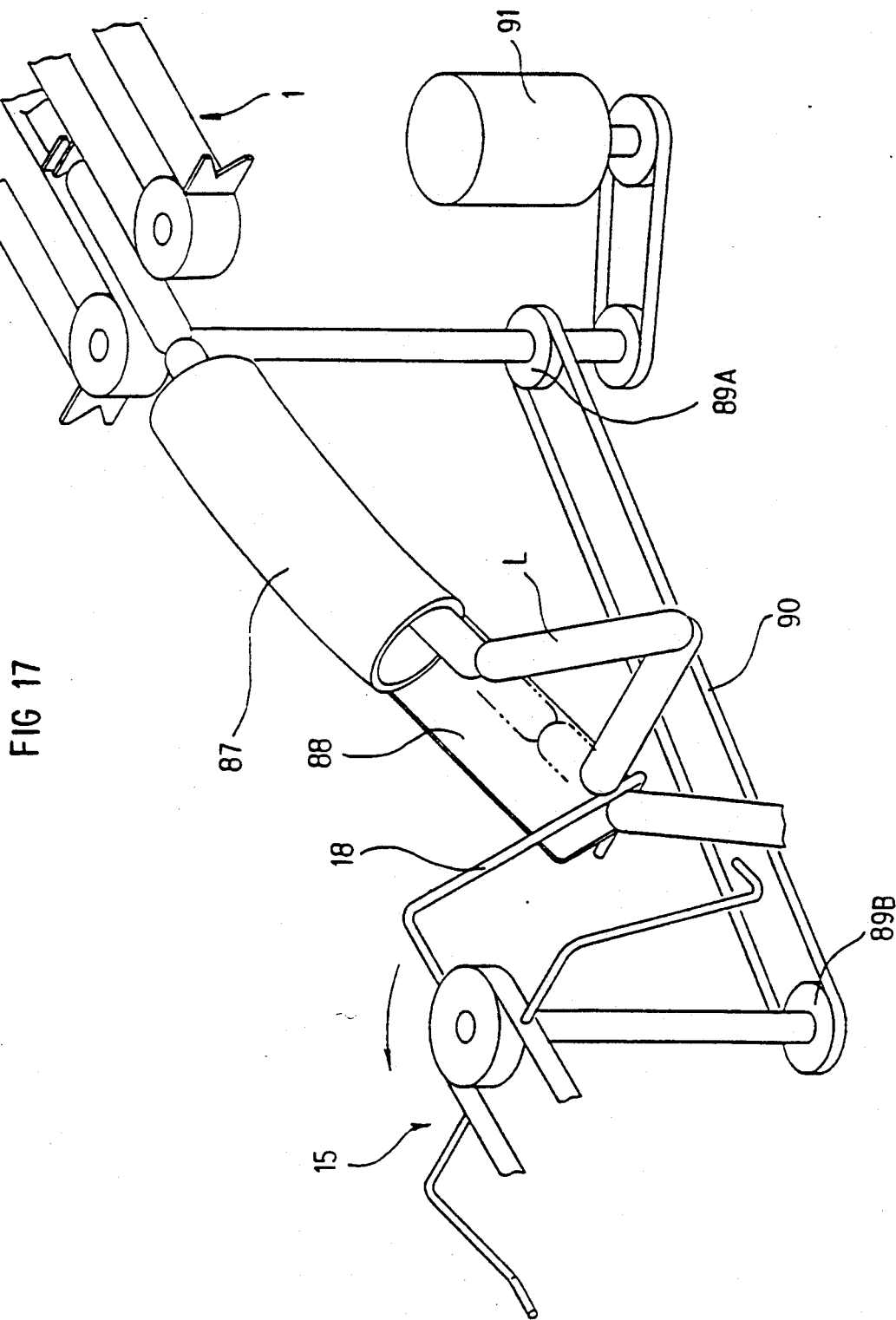

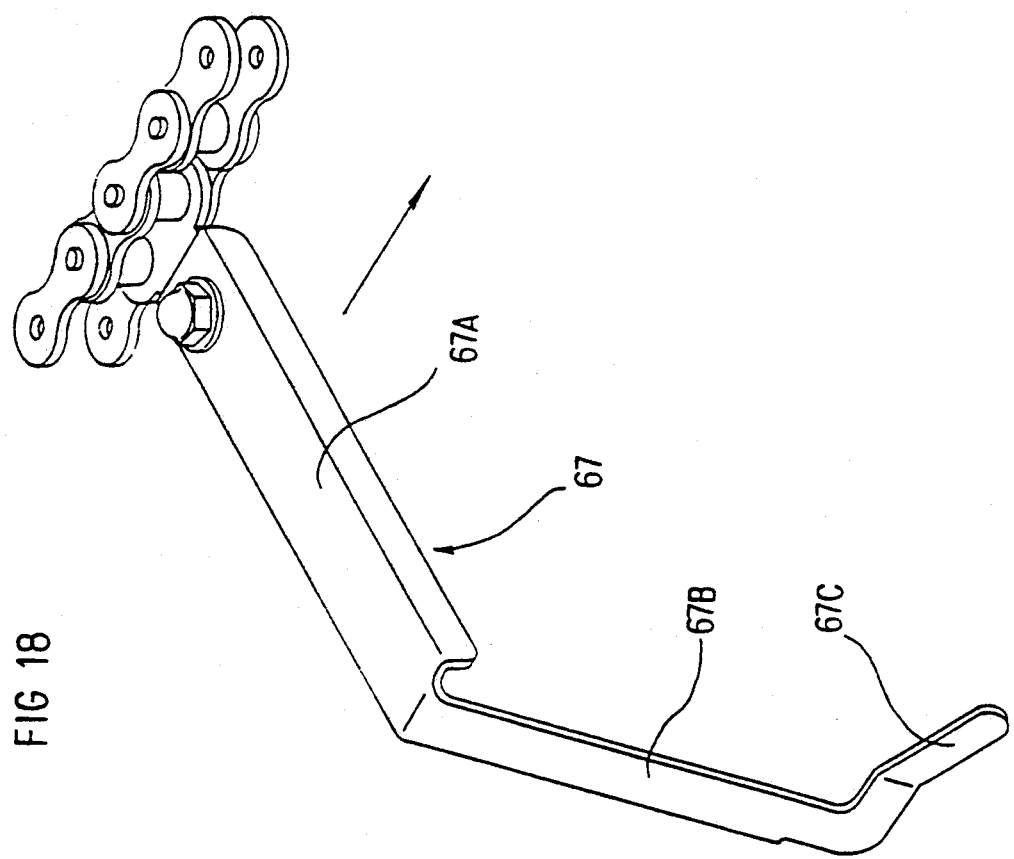

METHOD AND APPARATUS FOR SUSPENDING CASING PRODUCTS FILLED WITH MATERIAL

BACKGROUND OF THE INVENTION

1. Field of the Invention

The present invention relates to a method and an apparatus for allowing an elongated product in which a material for sausage or other foodstuff is stuffed in a casing, or linked products formed by twisting the elongated product, to be suspended sequentially in the form of loops from a plurality of retaining members that are moving.

2. Description of the Related Art

Casing products filled with a material are subjected to heat treatment or similar processing in an ensuing process, depending on the type of foodstuff used as a filler. Consequently, the casing products are generally suspended from a bar-shaped member called a smoking stick in a series of loops and are brought into a heat treatment chamber. In order to allow the series of loops to be suspended from the smoking stick, the casing products are conventionally suspended in the form of loops from a plurality of retaining members that are moving, and the smoking stick is then inserted through the loops so as to receive the series of loops. One such looping apparatus disclosed in Japanese Patent Publication No. 43210/1982, for instance, is known.

The arrangement of this known apparatus is such that a plurality of outwardly oriented supporting hooks are provided at predetermined intervals on an endless conveyor traveling in a horizontal plane, and sausages formed into a chain of linked products are dropped and supplied by a supplying conveyor toward the path of the supporting hooks and are sequentially retained by the supporting hooks, thereby allowing the chain of linked sausages to be suspended in the form of loops.

However, the sausages that drop and move with force have the characteristic that their moving direction is difficult to change abruptly when they are retained by the supporting hooks. Therefore, with the known apparatus constructed as described above, since an attempt is made to retain the chain of sausages with each supporting hook in a free space, the chain of linked sausages located between the supplying conveyor and the supporting hook swings in conjunction with the movement of the supporting hook owing to the contact pressure at the time of engagement by the supporting hook. Hence, there are many cases where the linked sausages drop while sliding as they are down the supporting hook without being retained securely. The greater the speed of the sausages being dropped and supplied, or the shorter the length of the sausage links, the more noticeably this trend appears.

Sausages having a long link length have the characteristic that they are liable to be bent midway in the link, particularly in cases where their diameter is small. With the above-described known apparatus, the sausages supplied from the supplying conveyor drop in a free space, so that the path of the dropping sausages constantly changes unstably owing to the movement of the supporting hooks with the sausages suspended therefrom. As a result, the positional accuracy of the portions to be retained is low, and retention is likely to occur such that the sausage links supported by the supporting hooks are bent midway in the links. The higher the dropping speed of the sausages, the lower the positional accuracy of the portions to be retained.

SUMMARY OF THE INVENTION

Accordingly, an object of the present invention is to provide a method and an apparatus for suspending casing products filled with a material which allow an elongated product stuffed with a material for sausages or other foodstuff, or a chain of such products, to be suspended securely on a continuous, stable basis by means of retaining members regardless of the link length in the case of sausages having links, the apparatus also being capable of handling the linked sausages or the like that are supplied at high speed, thereby overcoming the above-described drawbacks of the conventional art.

(A) In accordance with the present invention, the aforementioned object with respect to a method thereof is attained by providing a method for suspending a product with a material filled in a casing, by means of a plurality of retaining members which are moving, comprising the steps of: supplying the product in a longitudinal direction thereof; causing the retaining member to move toward a path of the product in such a manner that a plane of movement of the retaining member at a position of intersection with the path of the product includes a horizontal component, i.e., a horizontal plane or a plane inclined with respect thereto (hereinafter referred to as a surface having a horizontal component; and causing the retaining member and a hampering member located at a forward position in a moving direction of the retaining member to coact in applying a braking force to the product in such a manner that a portion of the product located upstream of a portion where the product engages with the retaining member passes to a trailing side of the retaining member.

The above object with respect to an apparatus for implementing the above-described method is attained by providing an apparatus for suspending a product with a material filled in a casing, by means of a plurality of retaining members which are moving, comprising: supplying means for supplying the product in a longitudinal direction thereof; conveyor means having the retaining members adapted to move toward a path of the product in such a manner that a plane of movement of the retaining member at a position of intersection with the path of the product and includes a horizontal component; and a hampering member located forwardly of the path of the product in a moving direction of the retaining member and adapted to press the product in cooperation with one of the retaining members.

(B) With regard to an additional method, the aforementioned object is also attained by providing a method for suspending a product with a material filled in a casing, by means of a plurality of members which are moving, comprising the steps of: supplying the product in a longitudinal direction thereof via rectifying means; causing the retaining member to move toward a path of the product in such a manner that a plane of movement of the retaining member at a position of intersection with the path of the product includes a horizontal component; guiding the product by means of the rectifying means in such a manner that a form of passage of the product is changeable with respect to the rectifying means so as to allow the product to be retained by the retaining member; and exerting action upon the product in such a manner as to return the form of passage thereof which has changed, with respect to the rectifying means to the form persisting prior to the change, in preparation for retention by an ensuing retaining member.

With regard to an apparatus for implementing the above-described method, the above object is also attained by providing an apparatus for suspending a product with a material filled in a casing, by means of a plurality of retaining members which are moving, comprising: supplying means for supplying the product in a longitudinal direction thereof; rectifying means located downstream of the supplying means and adapted to guide the product supplied by the supplying means and toward conveyor means; the conveyor means having the retaining members adapted to move toward a path of the product in such a manner that a plane of movement of the retaining member at a position of intersection with the path of the product includes a horizontal component; wherein the rectifying means is provided with a space for rendering a form of passage of the product through the rectifying means changeable with respect to the rectifying means so as to allow the product to be retained by the retaining member.

(C) Furthermore, with regard to still another apparatus in accordance with the present invention, the above object is attained by providing an apparatus for suspending a product with a material filled in a casing, by means of a plurality of retaining members which are moving, comprising: supplying means for supplying the product in a longitudinal direction thereof; rectifying means located downstream of the supplying means and adapted to guide the product supplied by the supplying means and toward conveyor means; the conveyor means having the retaining members moving in a adapted to move toward a path of the product in such a manner that a plane of movement of the retaining member at a position of intersection with the path of the product includes a horizontal component; wherein a free space for permitting a form of passage of the product to change is formed between the rectifying means and the conveyor means so as to allow the product to be retained by the retaining member, and a path of movement of the retaining members forms a configuration of a circular arc having a center downstream of the rectifying means at a position of intersection with at least the path of the product, the retaining members and the supplying means being synchronized with each other by a wrapping connector driving gear.

In accordance with the method and the apparatus described in (A) above, when a retaining member which has moved toward a path of the product fed is brought into contact with a desired portion of the product, e.g., a linked portion in the case of a chain of products, a product link having that linked portion is pressed between the retaining member and the hampering member disposed in face-to-face relation thereto. By this pressing action, brakes are applied to the flow of the chain of products in the direction of its passage at the engaging portion, and the desired one of the linked portions is retained securely without slipping on the retaining member. The retaining member which has retained the desired linked portion continues to move in such a manner as to move away from the path of the chain of products. In addition, since the desired linked portion is retained by the retaining member in cooperation with the hampering member, even if the speed of the chain of products being fed is much higher than the moving speed of the retaining members, the chain of products passes positively to the trailing side of the retaining member without flowing to the moving-direction side of the retaining member. A desired length of the chain of products is supplied until an ensuing retaining member is brought into contact with an ensuing desired linked portion, thereby completing the suspension of the chain of products on one retaining member.

It should be noted that the pressing of a product link which is effected by the retaining member and the hampering member is meant to include not only cases where portions of contact between the respective members and the link overlap in the longitudinal direction of the link but also cases where they are spaced apart.

If the hampering member is disposed in such a manner as to be also brought into contact with a part of the chain of products located upstream of a desired linked portion when the retaining member is brought into contact with the desired linked portion, the hampering member is subjected to a force of the aforementioned upstream part of the chain of products acting in the traveling direction of the retaining member, so that the passage of the upstream part of the chain of products to the trailing side of the retaining member is further aided.

In accordance with the method and the apparatus described in (B) above, with respect to a chain of products passing through the rectifying means, the form of its passage inside the rectifying means is adjusted into a substantially fixed form by the rectifying means, and the chain of products is fed to a position of retention by the retaining member. When a desired linked portion of the chain of products has reached the retaining position, the desired linked portion is retained by the retaining member which has moved to the path of the chain of products, and that desired linked portion tends to move away from the rectifying means together with the movement of the retaining member. At that juncture, a link of the chain of products located at the downstream end portion of the rectifying means is swung in the opposite direction to the moving direction of the retaining member with the downstream end portion as a fulcrum. That link of the chain of products is pressed by the chain of products being supplied from the upstream side, and the amount of its swing is further increased as a result. Consequently, even if the speed of the chain of products being supplied is much higher than the moving speed of the retaining members, a situation does not occur in which the flow of the chain of products is jammed by any retaining member. In addition, a product-supplying force from the supplying means, which acts on the link retained by the retaining member, is reduced, and the slippage of that link on the retaining member does not occur. The upstream part of the chain of links connected to the aforementioned part of the chain of links which has been swung undergoes a change in its form of flow in the opposite direction to the moving direction of the retaining member, in conjunction with an increase in the amount of supply thereof. This change increases with an increase in the amount of supply; however, in preparation for retention of an ensuing linked portion by an ensuing retaining member, the chain of products is subjected to a force for returning its form to the one persisting prior to the change. That is, the part of the chain of products located in the rectifying means tends to return to its previous form by virtue of the movement of the retaining member on which the chain of products is suspended between the retaining member and the downstream end portion of the rectifying means, as well as by virtue of the inertia acting in the supplying direction that is inherent in the chain of products being supplied. Depending on the location of the chain of products being suspended, the chain of products is pushed by an ensuing retaining member, which also serves as returning action. It is also possible to have the rectifying means produce a force for returning the chain of products to its previous form and, in that case, the chain of products return speedily to the form persisting prior to the change. By the aforementioned form of passage of a product is meant to include not only the form of flow of the product inside the rectifying means. That is, there are cases where the aforementioned change in the form of passage of the product in the opposite direction to the moving direction of the retaining member includes a vertical component. There is a case where immediately after a product is retained by the retaining member, the form of passage of the product changes upward, and then while changing in the opposite direction to the moving direction of the retaining member in conjunction with the movement of the retaining member, the form changes in a downward direction with an increase in the amount of product being supplied. These changes in the form of passage takes place in an outer space of the rectifying means. Slender products of a substantially spherical configuration whose link length is extremely short can freely undergo a change in form at each linked portion. With this type of product, there are cases where the change in the form of passage takes place in the vertical direction only and does not include a component acting in the opposite direction to the moving direction of the retaining member.

It is preferred that the rectifying means exert braking action upon products, depending on their link length. Generally speaking, products with a short link length are difficult to be retained by the retaining member, while products with a long link length are retained easily. Therefore, if products of long link lengths are to be suspended, braking by the rectifying means is not required. For instance, in the case of a product formed with links of 2 to 6 cm or thereabouts each, if an interval between a downstream end portion of the rectifying means and a position of retention by the retaining member is set to be shorter than the link length, the retaining member which has been brought into contact with a desired linked portion passing through the retaining position presses the link between the same and the downstream end portion of the rectifying means, thereby braking the flow. The downstream end portion of the rectifying means functions as a hampering portion.

Furthermore, with the apparatus of (C) described above, while the product is being guided positively by the rectifying means as in the case of the aforementioned cases, the product undergoes a change in the form of its passage in a space between the rectifying means and the retaining member due to engagement by the retaining member, in order to effect suspension. At that juncture, since the retaining members and the supplying device are synchronized with each other by a wrapping connector driving gear, even if the supplying means is operated at high speed, the retaining member securely captures a predetermined portion of the product, e.g., a linked portion.

The above and other objects, features and advantages of the invention will become more apparent from the following detailed description of the invention when read in conjunction with the accompanying drawings.

BRIEF DESCRIPTION OF THE DRAWINGS

FIG. 1 is an overall perspective view of an apparatus in accordance with a first embodiment of the present invention;

FIGS. 2A-2D illustrate a rectifying device shown in FIG. 1, in which

FIG. 2A is a side-elevational view;

FIG. 2B is a rear view;

FIG. 2C is a view taken in the direction of arrow C in FIG. 2A;

FIG. 2D is a view taken in the direction of arrow D in FIG. 2A;

FIG. 3 is a view taken in the same direction as that of FIG. 2D and illustrating a modification of the rectifying device shown in FIGS. 2A to 2D;

FIG. 4 is a top plan view, partly cutaway, of an essential portion illustrating a state of retention of a chain of linked products in the apparatus shown in FIG. 1;

FIG. 5 is a side-elevational view of FIG. 4;

FIGS. 7 to 9 are top plan views illustrating a change in the form of the chain of linked products having a short link and a long link, in which FIG. 7 is the case of a short link;

FIG. 8 is a case in which a long link is curved;

FIG. 9 is a case in which the long link is bent;

FIG. 10 is a perspective view of an apparatus in accordance with a second embodiment;

FIGS. 11A-11D are diagrams illustrating a modification of the second embodiment, in which FIG. 11A is a top plan view;

FIG. 11B is a side-elevational view;

FIG. 11C is a view taken in the direction of arrow C in FIG. 11B;

FIG. 11D is an end view taken in the direction of arrow D in FIG. 11B;

FIGS. 12A and 12B are diagrams illustrating still another modification of the second embodiment, in which FIG. 12A is a top plan view;

FIG. 12B is a side-elevational view;

FIGS. 13A-13D illustrate an apparatus in accordance with a third embodiment, in which FIG. 13A is a top plan view;

FIG. 13B is a side-elevational view;

FIG. 13C is a view taken in the direction of arrow C in FIG. 13B;

FIG. 13D is an end view of the rectifying device taken in the direction of arrow D in FIG. 13B;

FIG. 16 is a perspective view of an apparatus in accordance with a sixth embodiment;

FIG. 17 is a perspective view of an apparatus in accordance with a seventh embodiment; and FIG. 18 is a perspective view illustrating a modification of a retaining member which can be used in the respective embodiments of the present invention.

DESCRIPTION OF THE PREFERRED EMBODIMENTS

Figure 6:
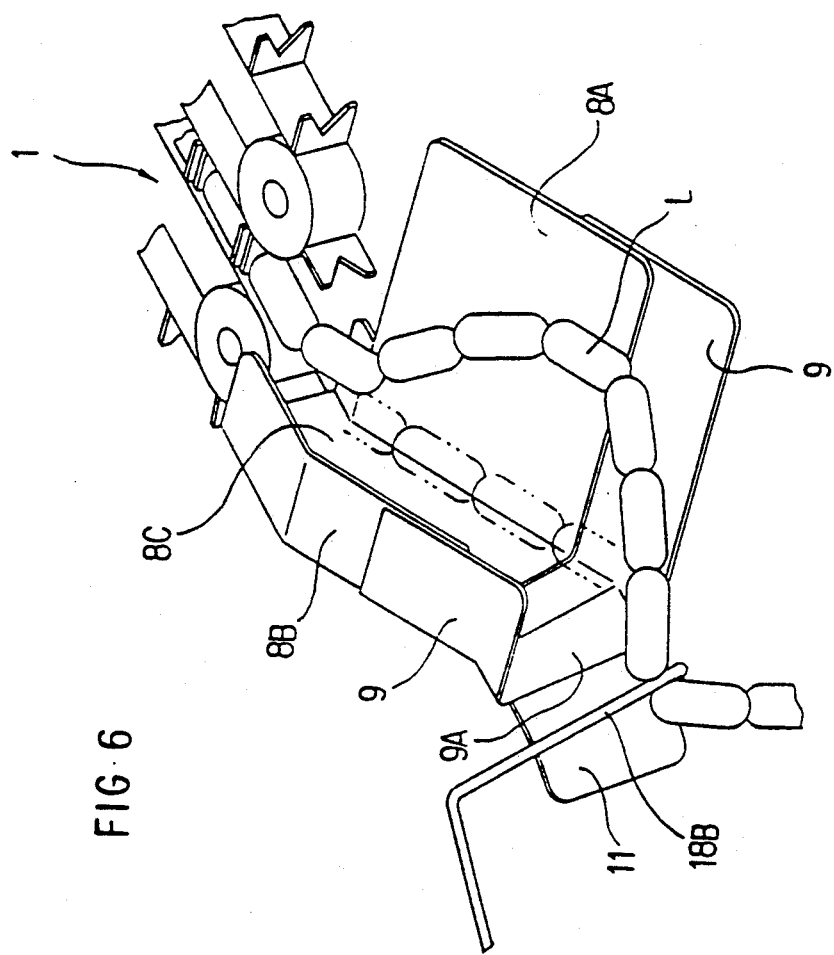
FIG. 6 is a perspective view of the essential portion at the time when the chain of linked products having a short link is supplied in the apparatus shown in FIG. 1.

Referring now to the accompanying drawings, a description will be given of the embodiments of the present invention.

First, an apparatus in accordance with a first embodiment of the present invention will be described with reference to FIGS. 1 to 9.

FIG. 1 is an overall perspective view of the apparatus in accordance with the first embodiment of the present invention.

In FIG. 1, reference numeral 1 denotes a supplying device for supplying chains of linked products in which a material for sausages or other foodstuffs is stuffed in casings, the chains of linked products being supplied in their longitudinal direction. The supplying apparatus 1 comprises a pair of endless chains or belts 3 that are trained between sprockets or rollers 2, 2 and are provided with pinchers 3A, the pair of endless chains or belts 3 being disposed in opposed and parallel relation with each other. The arrangement is such that the chain of products is continuously fed out in the longitudinal direction (rightward in the illustrated example) while it is being sandwiched or squeezed between the pair and being drawn by the pinchers. The sprockets or rollers 2 are rotatively driven by a shaft 6 which is driven by a motor 4 via a chain 5. The above-described supplying device 1 may be substituted by a known linking device disclosed in Japanese Patent Publication No. 5899/1966.

A rectifying device 7 is disposed at an exit portion (a right-hand portion in the drawing) of the supplying device 1 in such a manner as to face the exit portion. Upon receiving the chain of products delivered from the supplying device 1, the rectifying device 7 is adapted to introduce the chain of products to a position for retention by a retaining member to be described later. As its details are shown in FIGS. 2A to 2D and FIG. 6 (a perspective view of the rectifying device 7 taken in the direction of arrow X in FIG. 2B), the rectifying device 7 has a configuration in which it is inclined downward in the flowing direction of the chain of products, and one of its lateral sides is open. A body 8 of the rectifying device 7 comprises a bottom portion 8A serving as a wide guide surface extending horizontally perpendicularly to a path of travel of the chain of linked products, a top plate portion 8B opposing thereto, and a side portion 8C connecting the two portions, thereby covering the path of travel of the chain of linked products from three sides. Hence, the body 8 of the rectifying device 7 has a configuration in which the body 8 is open in the longitudinal direction of the aforementioned path and is also open at one side thereof. It should be noted that the bottom portion 8A may be arranged to extend horizontally in a cross section perpendicular to the aforementioned path, as shown in FIG. 2D, or may be inclined downward toward the side portion 8C, as shown in FIG. 3. An extension member 9 having substantially the same sectional configuration as the body 8 is provided at a downstream portion of the body 8 in such manner that its installation position can be altered in the direction of the path by means of a screw 10. The arrangement is such that an interval between an intermediate portion 18B of a hook 18, which will be described later, and a downstream end of the extension member 9 can be adjusted, as required. A downstream end portion of the extension member 9 constitutes an inclined portion 9A which is inclined in the traveling direction of the retaining members and serves as a hampering portion, a resilient member 11 being affixed to the inclined portion 9A. The resilient member may be disposed separately from the rectifying device. Furthermore, as for the resilient member, the member itself may be formed of a resilient material or it may be of a type in which a metallic plate is urged by a spring or the like. It should be noted that the resilient member 11 is not essential. The resilient member 11 is selected as required, depending on the difficulty of retaining the chain of products by means of the hook 18.

The rectifying device 7 is arranged such that a support 12 for mounting the rectifying device 7 on a frame of the apparatus of this embodiment is adjustable in terms of its sliding position with respect to a mounting column 13 of the frame and can be positioned at an arbitrary height by means of a screw 14. Thus the rectifying device 7 can receive the chain of products from the supplying device 1 at an optimum position.

A conveyor device 15 is disposed downstream of the rectifying device 7, as shown in FIG. 1. The conveyor device 15 has an endless chain 17 trained between sprockets 16, 16 at spaced positions and adapted to travel substantially in a horizontal plane, as indicated by arrows. A plurality of outwardly projecting hooks 18 which serve as retaining members are disposed on the chain 17 at intervals. Each of the hooks 18 comprises a horizontal proximal fixing portion 18A, an intermediate portion 18B inclined downward therefrom, and a distal end portion 18C extending upward from the intermediate portion 18B and oriented forwardly in the direction of its travel. Thus the intermediate portion 18B and the distal end portion 18C form a V-shaped configuration. The positional relationship of each of the hooks 18 relative to the rectifying device 7 is determined such that the intermediate portion 18B of the hook intersects the path of flow of the chain of products downstream of the rectifying device 7 and that an interval between the intermediate portion 18B and the downstream end of the extension member 9 becomes smaller than the length of each link of the chain of products when the intermediate portion 18B has intersected the path of flow of the chain of products.

It should be noted that the aforementioned interval may be made longer than the length of the link of the chain of products. This interval may be set as required, depending on the difficulty of retaining the chain of products.

The conveyor device 15 thus constructed operates as one of the sprockets 16 is driven by a driving force imparted by the motor 4. At that time, the driving speed is adjusted by stretching a chain 21 between multi-stage sprockets 19, 20 so as to permit adjustment of the length of a loop of the chain of products suspended from the hook, i.e., the number of links. At the same time, synchronization is established between the supplying device 1 and the conveyor device 15 by adjusting the phases of the sprockets 19, 20 so that the hook can retain the linked portion (a constricted portion between links) of the chain of products. In the conveyor device 15 constructed as described above, a pair of rod-shaped guides 22 serve to guide the hooks 18 as they travel in a slidable manner, and to support the weight of the chain of products when they are suspended. The guides 22 are disposed on the outer sides of the chain 17 in parallel and support the proximal fixing portions 18A of the hooks 18.

A description will now be given of the operation of the apparatus of this embodiment constructed as described above. FIG. 4 is a top plan view of an essential portion sectioned at the side portion 8C of the rectifying means with the top plate portion 8B removed. FIG. 5 is a side-elevational view.

(1) First, in FIG. 4, the chain of products L being fed in the direction of arrow A by the supplying device 1 tends to move straightly forward while maintaining its path B and drops into a free space while being guided by the bottom portion 8A of the rectifying device 7. In cases where the chain of products L is fed at high speed by the supplying device 1, or the length of the link of the chain of products L is long, the chain of products L moves on the bottom portion 8A by changing its path while being guided by the top plate portion 8B.

In the rectifying device in which the bottom portion 8A is inclined downward toward the side portion 8C, as shown in FIG. 3, the chain of products passes through the rectifying device while being guided by the bottom portion 8A and the side portion 8C.

(2) The intermediate portion 18B of the hook 18 which has rotatingly moved from in the direction of arrow C engages a linked portion (constricted portion) L1 of the chain of products L at a forward position in the direction of movement of the hook relative to the aforementioned path B. In the light of the relationship between the path of the falling chain of products and the path of the moving hooks, the linked portion is retained not at the intermediate portion of the hook 18 but at the V-shaped portion of the hook 18.

(3) Upon receiving contact pressure due to engagement with the intermediate portion 18B of the hook, the retained portion of the chain of products moves together with the hook 18, and concurrently a portion of the chain of products immediately upstream of the retained portion is subjected to contact pressure in a squeezed state exerted by the inclined portion 9A of the extension member 9 and the resilient member 11 of the rectifying device. Accordingly, the flow of the chain of products in the falling direction is stopped at the retained portion, with the result that the portion of the chain of products located on the bottom portion 8A of the rectifying device between the supplying device 1 and the retained portion undergoes a change in its form of flow by curving in the opposite direction to the traveling direction of the hook, as shown in FIG. 4.

The inclined portion 9A of the extension member 9 serves to increase the time duration when the link retained by the hook is pressed, while the resilient member 11 serves to continue to further press the link on the hook remote from the inclined portion 9A. Consequently, the inclined portion 9A of the extension member 9 and the resilient member 11 render the change in the aforementioned form of flow, i.e., the form of passage, more positive.

(4) The portion of the chain of products curved as described above grows large with progress in the supply of the chain of products, and then drops from the rectifying device and is suspended from the V-shaped portion of the moving hook 18.

(5) After the hook 18 passes through an area downstream of the rectifying device, the chain of products returns to its original rectilinear path owing to its inertia and the like, and assumes the state described in step (1) above. In cases where the bottom of the rectifying device is inclined as shown in FIG. 3, the chain of products returns to its original rectilinear path speedily by means of a component force acting in the returning direction by virtue of its own weight, so that this arrangement is suitable for high-speed operation.

(6) Thus, by repeating the cycle of the aforementioned steps (1) to (5) with respect to ensuing hooks, the chain of products is suspended by the conveyor device 15 into the form of loops, and after suspension is completed for the entire one chain of products, the looped products are moved onto the smoking stick or the like so as to prepare for an ensuing process such as heat treatment.

Figure 7:
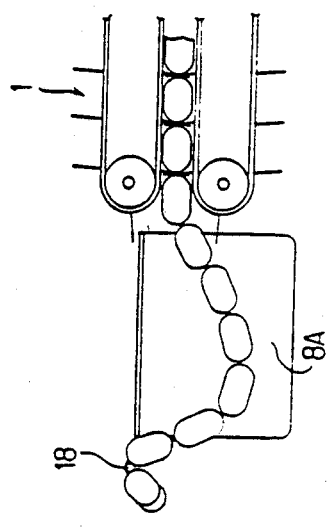
Figure 8:
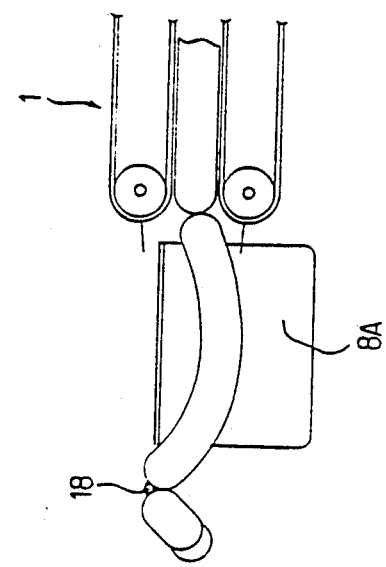
Figure 9:
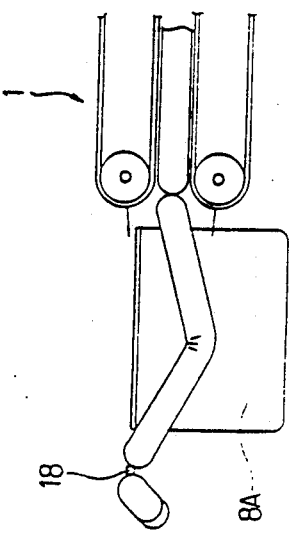

In this first embodiment, the hook and the extension member coacts in a case where the distance between the extension member 9 of the rectifying device 7 and the intermediate portion 18B of the hook 18 is set to be shorter than the length of each link of the chain of products, as described above. In this case, the force acting in the direction of changing the form of passage of the chain of products is transmitted directly to the chain of products on the rectifying device, and at the same time the linked portion retained by the hook is subjected to braking action due to being pressed by the hook and the extension member, so that the aforementioned change in the form is effected sufficiently. As for this change in the form of passage, if the links are short, the linked portions (constricted portions) connecting the links are positioned on the curved path, as shown in FIGS. 6 and 7. In the case of the chain of linked products having a long length wherein one link has substantially the same length as the rectifying device, one link itself becomes curved or bent, as shown in FIGS. 8 and 9, thereby undergoing a change in the form of passage. The aforementioned change in the form may take place not only in the area of the bottom portion 8A but also in an external space outside that area. In addition, this change in the form need not be effected with the chain of products being constantly brought into contact with the bottom portion 8A of the rectifying device, and the deformed portion of the chain of products may float upward by being separated from the bottom portion insofar as it has a component of force acting in the opposite direction to the traveling direction of the hook. At that juncture, if the top plate portion is present, the floating portion of the chain of products abuts against the top plate portion and thereby receives a force acting in the opposite direction to the traveling direction of the hook, with the result that the change in the form in that direction is effected speedily and positively.

In this first embodiment, the setting of the interval between the hook and the rectifying means (extension means) and the use or non-use of the resilient means may be determined as necessary, as has been described above. In this embodiment, if the aforementioned interval is set to be shorter than the link length, products of a short link length can be captured at an accurate retaining position. If the resilient member is added in the aforementioned setting, the supply of the chain of products can be effected at a greater speed. If the interval between extension member and the intermediate portion of the hook is set to a length corresponding to an outer diameter of the chain of products by altering the mounting position of the extension member, the braking action acting on the links can be increased further. Meanwhile, it is possible to set the aforementioned interval to a length greater than the link length without using the resilient member. This setting is suitable for products of a relatively long link length that can be retained easily. The characteristic feature of this setting is that the links are not pressed.

A rectifying device in accordance with a second embodiment is shown in FIG. 10. FIG. 10 is a perspective view taken in the same direction as that of the FIG. 6. A rectifying device 37 of this embodiment is used by substituting the rectifying device of the apparatus of the first embodiment. That is, the rectifying device 37 is mounted on a mounting column 13 of the frame of the apparatus of the first embodiment by means of an unillustrated supporting member integral with the rectifying device 37 in such a manner as to be inclined in the direction of flow of the chain of products. Although the rectifying device 37 of this embodiment is similar to that of the first embodiment in that the path of the chain of products is covered on three sides, but a bottom portion 37A has a narrower width toward the downstream side, and a side bottom portion 37C is inclined upwardly. The intermediate portion 18B of the hook 18 is adapted to pass in a range defined between an extension of the bottom portion 37A and an extension of the top plate portion 37B.

With the apparatus of this embodiment constructed as described above, when the form of the passing chain of products is curved and deformed, its central portion hangs down from a side edge 37A', i.e., a ridge of the side bottom portion 37C, thereby accelerating the change in the form. Then, after the chain of products is suspended on the hook, the chain of products, whose hanging length has increased in conjunction with an increase in the volume of the chain of products being supplied from the supplying device 1, is guided by the side edge 37' in conjunction with the movement of the hook 18 and flows out downstream of the rectifying device 37, and then the chain of products in the rectifying device 37 returns to its form persisting prior to the change in the form.

The side edge 37A' is inclined toward a path for supplying the products by means of the supplying device 1 along the path of the products so that the chain of products hanging down from the side edge 37A' slides speedily along the side edge 37A' toward the path for supplying the products by means of the supplying device 1.

If the side bottom portion 37C of the second embodiment is inclined gently downward in a transverse direction thereof, if the change in the form takes place only inside the rectifying device 37, the guiding for returning the form after suspension is effected on the inclined side bottom portion 37C (in the case of, for instance, the chain of products having a short link length). In such a rectifying device, if a side edge portion of the top plate portion is also inclined in parallel with the side edge portion of the aforementioned bottom portion, the deformation of the chain of products in a lateral direction is further accelerated in cases where the chain of products collides against the top plate portion. With respect to the rectifying device 37 of this second embodiment, the setting of the interval between the intermediate portion 18B of the hook 18 and the downstream end of the rectifying device 37 and the use or non-use of the resilient member 11 may be selected as required, as in the case of the rectifying device 7 of the apparatus of the first embodiment. Operational advantages in respective settings become substantially identical to those of the first embodiment, as exemplified by the fact that the downstream end portion of the rectifying device functions as a hampering member.

Furthermore, a preferred form of the second embodiment is shown in FIGS. 11A to 11D. In this example, a rectifying device 137 has an inclined ridge formed in such a manner that a side edge 137A' of a side bottom portion 137 intersects a side edge 137B' of a top plate portion 137B when viewed from the top, as shown in FIG. 11A. That is, when the chain of products which has been sent to the rectifying device 137 is brought into contact with the top plate portion 137B, the chain of products hangs down positively from the side edge 137A' of the side bottom portion 137C, as shown in FIG. 11B. As a result, the chain of products forms a configuration of a loop by depicting a large circular arc, as shown in FIG. 11C. Subsequently, the chain of products slides downstream along the side edge 137A' and returns to the initial path for supplying (refer to the two-dotted dash line in FIGS. 11C and 11D).

If the above-described form is adopted, even if the length of each link of the chain of products is relatively long, or the speed of passage of the chain of products is high, and the chain of products is liable to be jammed at the top plate portion, if provided, the chain of products readily undergoes a change in its form temporarily in the upward direction without any jamming, then undergoes a change in its form toward the side edge 137A' while moving along the aforementioned inclined side edge 137B', and subsequently hangs down from the side edge 137A'.

In addition, in cases where the length of each link of the chain of products is relatively long and the passing speed thereof is high, the chain of products in terms of the change in its form jumps out laterally by a relatively large distance, so that it is effective to form a downstream portion of the top plate portion 137B in a projecting manner, as indicated by the two-dotted dash line in FIG. 11A. The top plate portion thus formed in a projecting manner as indicated by the two-dotted dash line may be inclined downward as in the case of a wing portion 47C in accordance with a third embodiment which will be described later.

In addition, if the hampering member is added to the arrangement shown in FIGS. 11A to 11D, the retention of the chain of products by means of the hook is effected more positively. At that juncture, it is preferred that a gap be formed between the hook 18 and a hampering member 211 affixed to the rectifying device 237, and that the hampering member 211 is formed of a resilient member such as a plastic. Since the hook 18 and the hampering member 211 are close to each other, the provision of such a hampering member 211 causes the chain of products to be braked positively on the hook and does not produce noise accruing from the collision between the hook 18 and the hampering member 211. In addition, if the hampering member 211 is formed of a plastic, the chain of products is prevented from becoming damaged.

A description will now be given of a third embodiment of the present invention with reference to FIGS. 13A to 13D. In this embodiment, there is provided a rectifying device 47 which is more suitable for a chain of products having a longer link length and a larger diameter as compared with the foregoing embodiments. The rectifying device 47 of this embodiment is characterized in that, in contrast to the top plate portion of the foregoing embodiment shown in FIGS. 11A to 11D, there is provided a wing portion 47C serving as a restricting portion and extending in a downwardly inclining manner with respect to a top plate portion 47B.

Preferably, the wing portion 47C is connected to an edge of the top plate portion 47B in the illustrated triangular configuration or in a curvilinear configuration without projecting abruptly from the top plate portion 47B in, for instance, a stepped form. Preferably, this wing portion 47C extends laterally from the vicinity of an outermost position of a side edge 47A' of a side bottom portion 47A.

Furthermore, the rectifying device 47 of this embodiment in terms its vertical direction has an angle of downward inclination at least a downstream portion thereof. For instance, it suffices to adopt a configuration in which the supplying device and the hook are made to correspond to each other at one angle of inclination; however, in order to allow smooth passage of the chain of products which is large in both diameter and length, a configuration is preferably adopted in which a horizontal section I corresponding to the supplying device is provided on the upstream side (on the supplying device side), a bend is provided midway, and a downwardly inclined section II is provided in a downstream portion, as shown in FIG. 13B. As for the manner of this bending, it may be bent as illustrated or may be such as to be curved in a continuous manner, although not illustrated. At any rate, it is sufficient if the bend or curve undergoes a transition in such a manner that the downstream portion is inclined downward by a predetermined angle. In the case of a chain of products having a large outside diameter and a large link length, the links are difficult to deform. In this embodiment arranged as described above, even in the case of the chain of products which is difficult to deform and tends to deviate laterally by a large distance in terms of its form of flow by being retained by the hook, the chain of products is subjected to a restricting force by the wing portion 47C serving as the restricting portion in such a manner that the amount of deviation remains within a predetermined range allowing the chain of products to be retained by an ensuing hook. Consequently, the form of passage of the chain of products changes positively in a downward direction, and after temporarily depicting a loop, it moves speedily along the side edge 47A' in the direction of the arrow and returns to the initial path of the chain of products (see the two-dotted dash line in FIGS. 13C and 13D).

Figure 14:
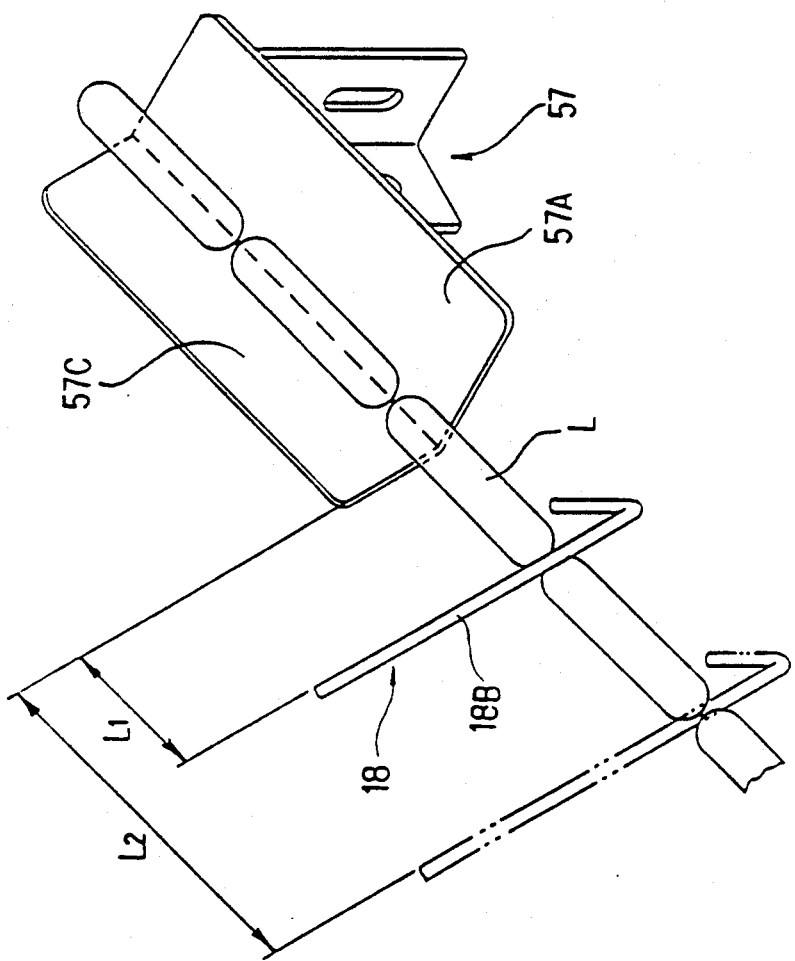
FIG. 14 is a perspective view of an apparatus in accordance with a fourth embodiment.

FIG. 14 shows a rectifying device in accordance with a fourth embodiment. A rectifying device 57 of this embodiment shows a prototype of a rectifying means of the present invention, wherein no top plate portion is provided and a cross-sectional configuration taken along a plane orthogonal to the path of the chain of products is simply made into an L-shaped configuration, and the rectifying device 57 comprises a bottom portion 57A serving as a guide surface and a side surface 57C. With respect to the rectifying device 57 constructed as described above, the interval between the intermediate portion 18B of the hook 18 and the downstream end of the rectifying device 57 can also be set as required, as in the case of distances L1 and L2 illustrated in the drawing, in the same way as the above-described first embodiment. If the interval is set to the distance L1 which is shorter than the length of each link of the chain of products, the links are pressed by both the intermediate portion 18B and the downstream end of the rectifying device 57 serving as a hampering portion, thereby applying brakes to the flow of the links, in the same way as the first embodiment.

Figure 15:
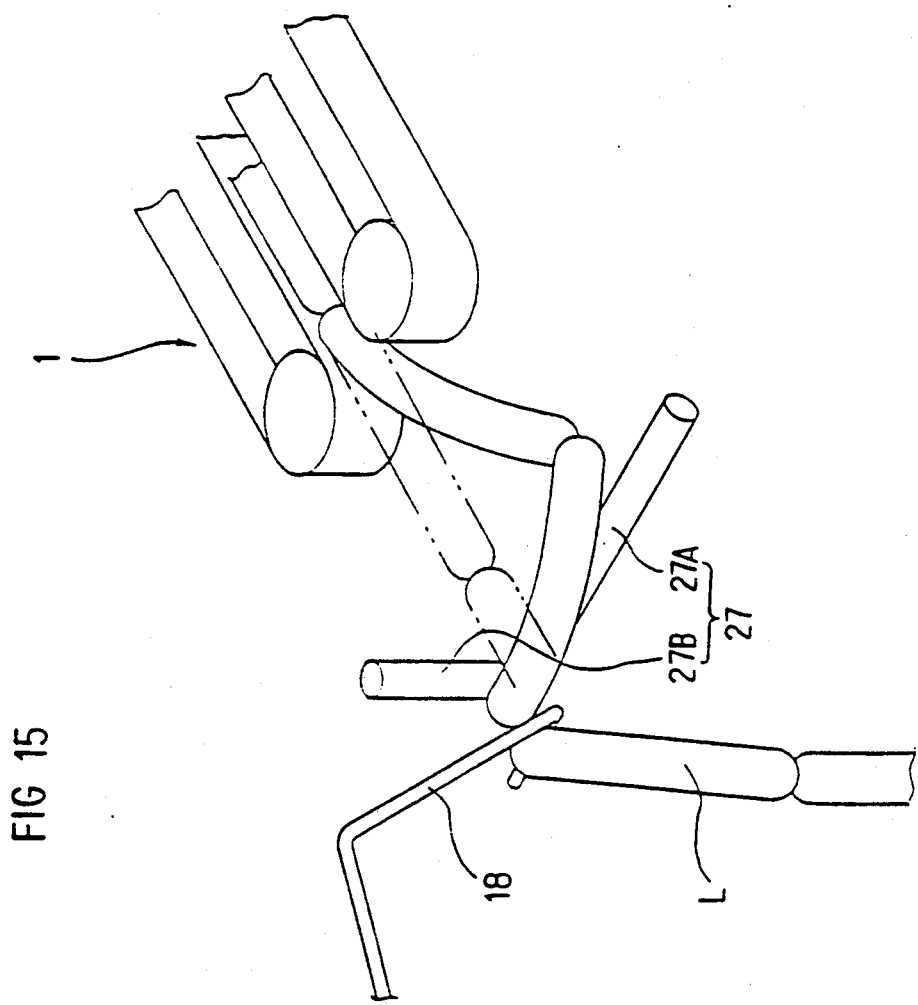
FIG. 15 is a perspective view of an apparatus in accordance with a fifth embodiment.

FIG. 15 illustrates a fifth embodiment of a rectifying device showing another prototype of the rectifying means in accordance with the present invention.

A rectifying device 27 of this embodiment is formed of a round-rod member bent into an L-shaped configuration. The rectifying device 27 has a horizontal portion 27A and a vertical portion 27B, and horizontal portion 27A serves to introduce the chain of products L to a position of engagement with the hook 18, while the vertical portion 27B serving as a hampering portion coacts with the hook 18 in exerting braking action upon the chain of products. In this case, it is not preferable to provide a large distance between the horizontal portion 27A and the supplying device 1, and an arrangement is preferably provided such that the chain of products being supplied smoothly reaches the horizontal portion by means of inertia without drooping down by a large portion. Accordingly, the aforementioned distance is determined on the basis of the relation between the supplying speed and the weight per unit length of the chain of products.

The rectifying devices of the first to fifth embodiments described above are respectively provided with a hampering portion. However, the fact that the rectifying device is provided with a hampering portion is not essential in the present invention, as described above, and it suffices insofar as the rectifying device has a space for permitting a change in the form of the chain of products due to retention by the retaining member. Accordingly, a stable change in the form constantly takes place, with the result that the chain of products is suspended securely on the retaining member. Since the rectifying means undergoes a change in the form of passage within the area of the rectifying means, it is possible to arrange the apparatus into a compact size as compared with a closed-type rectifying means which will be described later. In addition, the cleaning of the inner portion of the rectifying means can be effected with ease.

In a sixth embodiment shown in FIG. 16, only a resilient member 77 serving as a hampering member is present between the supplying device 1 and the hook 18 traveling in a horizontal plane. In this embodiment, each of the hooks travels along an arcuate path at a point of intersection with the path of the chain of products L, is brought into contact with a desired linked portion of the chain of products when passing through that point of intersection, causes the resilient member 11 to press the linked portion, and hampers the flow of the chain of products at that point of intersection, thereby effecting the suspension.

Furthermore, as in a seventh embodiment illustrated in FIG. 17, the hampering member and the rectifying device may be used jointly. At that juncture, it is not necessary for a lateral side to be open over the entire lateral side from the upstream side to the downstream side thereof as shown in FIGS. 1 and 2A to 2D. The rectifying device of the apparatus in accordance with this embodiment comprises a tubular member 87 as illustrated, which is not provided with a space for permitting a change in the form of the chain of products. In this embodiment shown in FIG. 17, a hampering member 88 is provided at a downstream end portion of the tubular member 87 disposed on the upstream side. In such a case, the change in the form of the chain of products takes place in a downstream area of the tubular member 87, i.e., within a range along which the hampering member 88 extends. At that juncture, the conveyor device 15 having the hooks 18 and the supplying device 1 serving as a linking means known through Japanese Patent Publication No. 5899/1966 are set in such a manner that the hooks 18 and the supplying device 1 are synchronized so that the hook 18 traveling while depicting an arcuate configuration in a manner similar to FIG. 16 captures the linked portion at the point of intersection with the path of the chain of products. The aforementioned synchronization is attained by stretching a chain 90 between sprockets 89A, 89B that are set to an appropriate speed ratio and by driving the two devices by means of an identical driving source (motor) 91. Each of the hooks 18 moves in such a manner as to substantially orthogonally (when the apparatus of this embodiment is viewed from directly above) intersect the path of the chain of products flowing out from the rectifying means, and retains a desired linked portion with the V-shaped portion of the hook 18. Accordingly, since the change in the form of passage during retention is effected readily, the resilient member which is the hampering member 88 is not required in the case of a long chain of products having a long link length.

Furthermore, although the foregoing embodiments of the present invention have been described by citing a chain of linked products by way of example, it will be appreciated that any product having a degree of freedom in undergoing a change of form to a degree commensurate with that of a chain of products can be suspended quite favorably in accordance with the present invention even though the product is not particularly provided with constricted portions.

With respect to the hooks serving as retaining members, it is possible to fabricate each of the hooks by bending a tabular member instead of that formed by bending a round-rod member as in the case of the aforementioned embodiments. For instance, as shown in FIG. 18, if an intermediate portion 67B and a distal end portion 67C are respectively provided with a width in the traveling direction (in the direction indicated by the arrow) of a hook 67, and if the thickness thereof in a direction perpendicular to that direction, i.e., in a direction substantially perpendicular to the path of the chain of products, is made thin, the hook 67 can engage and retain a constricted portion of even a chain of products having short constricted portions while maintaining a sufficient strength. In addition, if the horizontal portion 67A is provided with side-bending processing, its bending strength in the longitudinal direction thereof can be improved remarkably.

Since the intermediate portion 67B has a width in the traveling direction, the time duration during which braking action is exerted upon each link by the intermediate portion 67B in cooperation with the rectifying means can be increased.

In the foregoing embodiments, the arrangement is such that as the endless chain to which the hooks are attached rotates around outer peripheries of the sprockets, the hooks serving as the retaining members travel in such a manner as to depict a circular arc, and retain the chain of products at that time. However, the center of rotation at that time is preferably located in a forward position in the traveling direction of the hooks relative to the path of the chain of products fed. In addition, in the present invention, the manner of travel of the aforementioned hooks is not restricted to the aforementioned arrangement, and each of the hooks may effect engagement with the chain of products at a portion of rectilinear movement thereof.

In the foregoing embodiments, the conveyor means is rotatively driven via a chain by the supplying means driven by a motor, and the arrangement provided is such that a ratio of the rotational speed between the supplying means and the conveyor means is constantly maintained at an appropriate set value. However, in these embodiments, the speed of the conveyor means relative to that of the supplying means may be controlled by a known detecting and controlling means so that a desired number of links are suspended on each retaining member.

Although in the foregoing embodiments a description has been given of a case in which the retaining members are moved continuously, the retaining members may be moved intermittently. Specifically, by detecting a predetermined length of the product or the number of links in the case of a chain of linked products, the retaining members are made to travel at a predetermined timing to allow one of the retaining members to retain the product, and the retaining members are stopped until an ensuing predetermined timing. If this arrangement is adopted, since a time required for the product whose form of passage has undergone a change to return to a position of passage persisting prior to the change can be secured, thereby making it possible to enhance the positional accuracy for engagement between the retaining member and the product.

If an apparatus for manufacturing a chain of products is interlinked with the suspending apparatus in accordance with the present invention, a product conveying means of the manufacturing apparatus can be used as the supplying means of the present invention.

In accordance with the present invention, as described above, since brakes are applied to the product through cooperation between the retaining member and the hampering member, or the product is fed through the rectifying means, the product can be suspended securely from the retaining member even if the product is fed at high speed, thereby effecting a high-speed suspending operation.

Since the flow of the product can be stopped readily at the retaining member through cooperation between the retaining member and the hampering member, even a chain of linked products which has a short link length and is difficult to be retained by the retaining member can be suspended from the retaining member securely and stably without undergoing slippage on the retaining member.

Since the state of flow of the chain of linked products at a time when the retaining member is brought into contact with a desired linked portion is adjusted by the rectifying means, the retaining member is always capable of accurately capturing a desired linked portion of the chain of linked products. Even with a chain of linked products having a long link length, trouble such as the link being suspended midway thereof does not occur.

Since the form of passage of the product inside the rectifying means is rendered changeable in the opposite direction to the traveling direction of the retaining member, the product flow is not obstructed by the retaining member and the product flows out smoothly in the opposite direction to the traveling direction of the retaining member before the product is retained by the retaining member.

If the rectifying means and the retaining member coact in applying brakes on the chain of linked products passing through the rectifying means, the chain of linked products is always captured accurately at a desired linked portion thereof by the retaining member, and can be readily made to undergo a change in its form in the opposite direction to the traveling direction of the retaining member. In addition, since the product flow can be stopped at the retaining member, it is possible to suspend chains of linked products of sizes ranging widely from a short link length to a long link length at high speed on a stable basis.

What is claimed is:

1. A method for suspending a product with a material filled in a casing, by means of a plurality of retaining members which are moving, comprising the steps of:
   supplying said product in a longitudinal direction thereof;
   causing said retaining members to move toward a path of said product in such a manner that a plane of movement of said retaining members at a position of intersection with the path of said product includes a horizontal component; and
   causing each of said retaining members sequentially and a hampering member located forwardly of the path of said product in a moving direction of said retaining members to coact in applying a braking force to said product in such a manner that a portion of said product located upstream of a portion where said product engages with each of said retaining members passes to a trailing side of each of said retaining members.

2. An apparatus for suspending a product with a material filled in a casing, by means of a plurality of retaining members which are moving, comprising:
   supplying means for supplying said product in a longitudinal direction thereof;
   conveyor means having said retaining members adapted to move toward a path of said product in such a manner that a plane of movement of said retaining members at a position of intersection with the path of said product includes a horizontal component; and
   a hampering member located forwardly of the path of said product in a moving direction of said retaining members and adapted to press said product in cooperation with one of said retaining members.

3. An apparatus for suspending a product with a material filled in a casing according to claim 2, further comprising rectifying means interposed between said supplying means and said hampering member, said rectifying means being formed so as to guide said product in a downstream direction.

4. A method for suspending a product with a material filled in a casing, by means of a plurality of retaining members which are moving, comprising the steps of:
   supplying said product in a longitudinal direction thereof via rectifying means;
   causing said retaining members to move toward a path of said product in such a manner that a plane of movement of said retaining members at a position of intersection with the path of said product includes a horizontal component;
   guiding said product by means of said rectifying means in such a manner that a form of passage of said product is changeable with respect to said rectifying means so as to allow said product to be retained by each of said retaining members; and
   sequentially exerting action upon said product in such a manner as to return the form of passage thereof which has changed with respect to said rectifying means, to the form persisting prior to said change, in preparation for retention by an ensuing retaining member.

5. A method for suspending a product with a material filled in a casing according to claim 4, wherein the retaining members which are moving in a plane which includes a horizontal component move intermittently in a predetermined cycle so as to retain the product at an interval of predetermined length.

6. A method for suspending a product with a material filled in a casing according to claim 4, wherein said change in the form of passage of said product through said rectifying means takes place in a direction having a component of an opposite direction to a moving direction of said retaining members.

7. An apparatus for suspending a product with a material filled in a casing, by means of a plurality of retaining members which are moving, comprising:
   supplying means for supplying said product in a longitudinal direction thereof;
   rectifying means located downstream of said supplying means and adapted to guide said product supplied by said supplying means toward conveyor means; and
   said conveyor means having said retaining members adapted to move toward a path of said product in such a manner that a plane of movement of said retaining members at a position of intersection with the path of said product includes a horizontal component,
   wherein said rectifying means is provided with a space for rendering a form of passage of said product through said rectifying means changeable with respect to said rectifying means so as to allow said product to be retained by each of said retaining members sequentially.

8. An apparatus for suspending a product with a material filled in a casing according to claim 7, wherein said rectifying means comprises a restricting portion for restricting an amount of change in the form of passage of said product to a trailing side of each of said retaining members.

9. An apparatus for suspending a product with a material filled in a casing according to claim 7, wherein said rectifying means has a hampering portion located forwardly of the path of said product in a moving direction of said retaining members and adapted to press said product in cooperation with one of said retaining members.

10. An apparatus for suspending a product with a material filled in a casing according to claim 9, wherein said rectifying means is formed by a bottom guide surface for receiving said product in a slidable state and by a side surface extending upwardly from a side of said bottom guide surface located on a moving-direction side each of said retaining members.

11. An apparatus for suspending a product with a material filled in a casing according to claim 10, wherein said rectifying means is provided with a resilient members for pressing said product in cooperation with said retaining members.

12. An apparatus for suspending a product with a material filled in a casing according to claim 9, wherein said rectifying means is provided with a resilient members for pressing said product in cooperation with each of said retaining members.

13. An apparatus for suspending a product with a material filled in a casing according to claim 7, wherein said rectifying means is formed by a bottom guide surface for receiving said product in a slidable state and by a side surface extending upwardly from a side of said bottom guide surface located on a moving-direction side of each of said retaining members.

14. An apparatus for suspending a product with a material filled in a casing according to claim 13, wherein said rectifying means is provided with a resilient members for pressing said product in cooperation with said retaining members.

15. An apparatus for suspending a product with a material filled in a casing according to claim 7, wherein said rectifying means is provided with a resilient members for pressing said product in cooperation with each of said retaining members.

16. An apparatus for suspending a product with a material filled in a casing according to claim 7, wherein a distance between a lower end of said rectifying means in a supplying direction and said retaining member for retaining said product is shorter than a length of each link forming said product.

17. An apparatus for suspending a product with a material filled in a casing according to claim 7, wherein a distance between a lower end of said rectifying means in a supplying direction and said retaining members for retaining said product is longer than a length of each link forming said product.

18. An apparatus for suspending a product with a material filled in a casing, by means of a plurality of retaining members which are moving, comprising:
supplying means for supplying said product in a longitudinal direction thereof;
rectifying means located downstream of said supplying means and adapted to guide said product supplied by said supplying means toward conveyor means; and
said conveyor means having said retaining members adapted to move toward a path of said product in such a manner that a plane of movement of said retaining members at a position of intersection with the path of said product includes a horizontal component,
wherein a free space for permitting a form of passage of said product in change is formed between said rectifying means and said conveyor means so as to allow said product to be retained by each of said retaining members, sequentially and
a path of movement of said retaining members forms a configuration of a circular arc having a center downstream of said rectifying means at a position of intersection with at least the path of said product, said retaining members and said supplying means being synchronized with each other by a wrapping connector driving gear.

* * * * *

UNITED STATES PATENT AND TRADEMARK OFFICE
CERTIFICATE OF CORRECTION

PATENT NO. : 5,073,142

DATED : December 17, 1991

INVENTOR(S) : Minoru KASAI et al.

It is certified that error appears in the above-identified patent and that said Letters Patent is hereby corrected as shown below:

Title page, Item [73] Assignee:, delete "Hitec Co., Ltd." and
insert -- HITEC CO., LTD.--

Column 2, line 28, delete "component;" and insert -- component); -- .

Column 2, line 46, delete "product and includes" and
insert -- product includes -- .

Column 2, line 54, delete "of members" and
insert -- of retaining members -- .

Column 2, line 67, after "changed" and before "with" delete --,--.

Column 2, line 68, after "means" and before "to the" insert -- , -- .

Column 3, line 11, after "means" delete -- and -- .

Column 3, line 12, after "means;" and before "the conveyor" insert -- and -- .

Column 3, line 31, delete "means and toward" and insert -- means toward -- .

Column 3, line 31, after "means;" and before "the conveyor" insert -- and -- .

Column 3, line 32, delete -- moving in a -- .

Column 9, line 23, delete "moved from in" and insert -- moved in -- .

Column 11, line 33, delete " 37' " and insert -- 37A' -- .

Column 13, line 10, delete "in terms its" and insert -- in terms of its -- .

Column 13, line 61, delete "as the above." and insert -- as the above- -- .

Column 14, line 48, delete "11" and insert -- 77 -- .

Column 17, line 70 (Claim 4, line 15), delete "retaining members; and" and
insert -- retaining members sequentially; and -- .

UNITED STATES PATENT AND TRADEMARK OFFICE
CERTIFICATE OF CORRECTION

PATENT NO. : 5,073,142

DATED : December 17, 1991

INVENTOR(S) : Minoru KASAI et al.

It is certified that error appears in the above-identified patent and that said Letters Patent is hereby corrected as shown below:

Column 18, line 1 (Claim 4, line 16), before "exerting"
    delete -- sequentially -- .

Column 18, line 60 (Claim 10, line 7), delete "side each of" and
    insert -- side of each of -- .

Column 18, line 64 (Claim 11, line 4), delete "members" and insert -- member --

Column 18, line 65 (Claim 11, line 5), delete "with said" and
    insert -- with each of said -- .

Column 18, line 69 (Claim 12, line 4), delete "bers for" and
    insert -- ber for -- .

Column 19, line 12 (Claim 14, line 4), delete "members" and insert -- member --

Column 19, line 13 (Claim 14, line 5), delete "with said" and
    insert -- with each of said -- .

Column 19, line 30 (Claim 17, line 4), delete "members for" and
    insert -- member for -- .

UNITED STATES PATENT AND TRADEMARK OFFICE
CERTIFICATE OF CORRECTION

PATENT NO. : 5,073,142
DATED : December 17, 1991
INVENTOR(S) : Minoru KASAI, et al It is certified that error appears in the above-indentified patent and that said Letters Patent is hereby corrected as shown below:

Column 20, line 19 (Claim 18, line 17), delete "product in change" and insert --product to change--.

Signed and Sealed this

Second Day of November, 1993

Attest:

BRUCE LEHMAN

*Attesting Officer*     *Commissioner of Patents and Trademarks*

REEXAMINATION CERTIFICATE (4155th)

United States Patent [19]
Kasai et al.

[11] B1 5,073,142
[45] Certificate Issued Sep. 19, 2000

[54] METHOD AND APPARATUS FOR SUSPENDING CASING PRODUCTS FILLED WITH MATERIAL

[75] Inventors: Minoru Kasai, Ebina; Minoru Nakamura, Tokyo, both of Japan

[73] Assignee: Hitec Co., Ltd., Tokyo, Japan

Reexamination Request:
No. 90/004,499, Dec. 27, 1996

Reexamination Certificate for:
Patent No.: 5,073,142
Issued: Dec. 17, 1991
Appl. No.: 07/512,209
Filed: Apr. 20, 1990

Certificate of Correction issued Nov. 2, 1993.

[30] Foreign Application Priority Data

Apr. 22, 1989 [JP] Japan .................................. 1-103106
Feb. 16, 1990 [JP] Japan .................................. 2-33668

[51] Int. Cl.[7] .................................................. B65G 37/00
[52] U.S. Cl. ........................................... 452/51; 452/46
[58] Field of Search ........................................ 452/51, 46

[56] References Cited

U.S. PATENT DOCUMENTS

| | | | |
|---|---|---|---|
| 3,964,129 | 6/1976 | Townsend | 452/51 |
| 4,218,003 | 8/1980 | Plewa et al. | 452/47 |
| 4,761,854 | 8/1988 | Schnell et al. | 452/51 |

*Primary Examiner*—Willis Little

[57] ABSTRACT

Disclosed are a method and an apparatus for suspending a chain of sausages or the like sequentially in the form of loops from moving hooks. The apparatus for implementing the method includes a supplying device for supplying the product in a longitudinal direction thereof; a conveyor having a plurality of hooks adapted to move toward a path of the product in such a manner that a plane of movement of the hook at a position of intersection with the path of the product includes a horizontal component; and a hampering member or a rectifying device. The hampering member is located forwardly of the path of the product in the moving direction of the hook and adapted to press the product in cooperation with the hook. The rectifying device is located downstream of the supplying device and adapted to guide the product supplied by the supplying device toward the conveyor. The products of varying sizes and link lengths are suspended on the hooks securely and stably even when supplied at high speed.

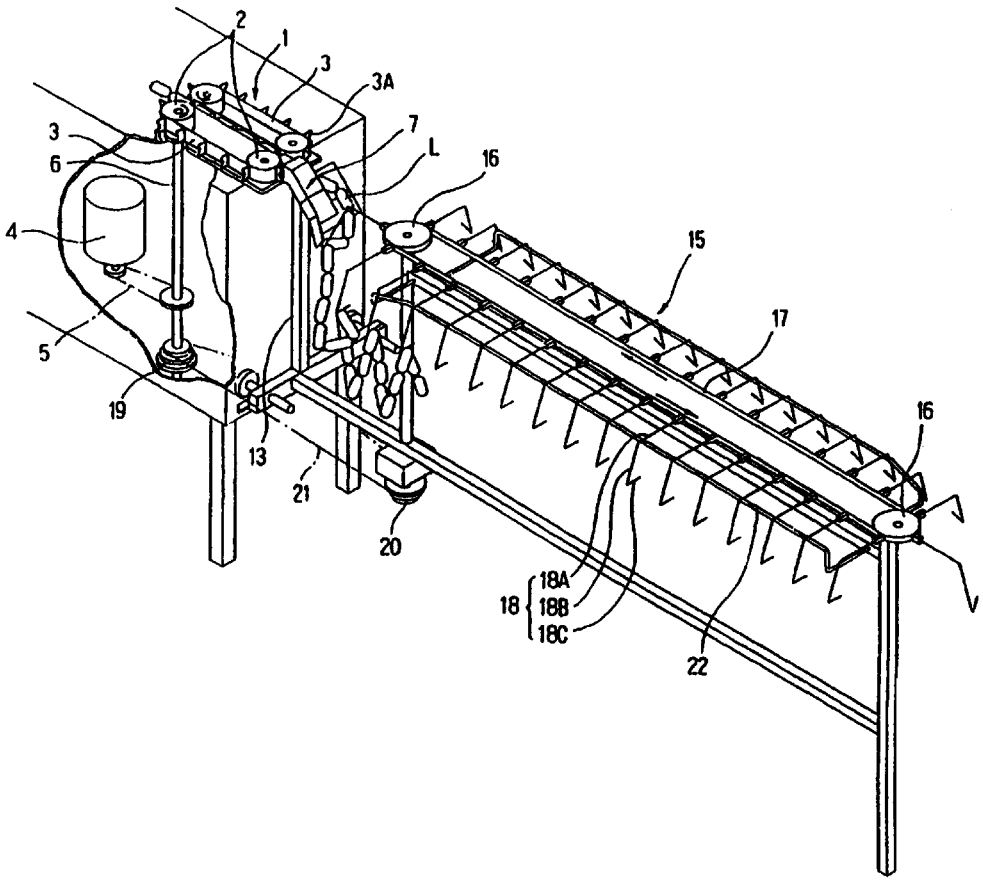

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 18 is confirmed.

Claims 1–4 and 7 are cancelled.

Claims 5, 6, 8, 9, 13 and 15–17 are determined to be patentable as amended.

Claims 10–12 and 14, dependent on an amended claim, are determined to be patentable.

New claims 19–27 are added and determined to be patentable.

5. A method for suspending a product with a material filled in a casing according to claim [4] *19*, wherein the retaining members which are moving in a plane which includes a horizontal component move intermittently in a predetermined cycle so as to retain the product at an interval of predetermined length.

6. A method for suspending a product with a material filled in a casing according to claim [4] *19*, wherein said change in the form of passage of said product through said rectifying means takes place in a direction having a component of an opposite direction to a moving direction of said retaining members.

8. An apparatus for suspending a product with a material filled in a casing [according to claim 7,] *by means of a plurality of retaining members which are moving, comprising:*

*supplying means for supplying said product in a longitudinal direction thereof;*

*rectifying means located downstream of said supplying means and adapted to guide said product supplied by said supplying means toward conveyor means; and*

*said conveyor means having said retaining members adapted to move toward a path of said product in such a manner that a plane of movement of said retaining members at a position of intersection with the path of said product includes a horizontal component,*

*wherein said rectifying means is provided with a space for rendering a form of passage of said product through said rectifying means changeable with respect to said rectifying means so as to allow said product to be retained by each of said retaining members sequentially,* wherein said rectifying means comprises a restricting portion for restricting an amount of change in the form of passage of said product to a trailing side of each of said retaining members.

9. An apparatus for suspending a product with a material filled in a casing [according to claim 7,] *by means of a plurality of retaining members which are moving, comprising:*

*supplying means for supplying said product in a longitudinal direction thereof;*

*rectifying means located downstream of said supplying means and adapted to guide said product supplied by said supplying means toward conveyor means; and*

*said conveyor means having said retaining members adapted to move toward a path of said product in such a manner that a plane of movement of said retaining members at a position of intersection with the path of said product includes a horizontal component,*

*wherein said rectifying means is provided with a space for rendering a form of passage of said product through said rectifying means changeable with respect to said rectifying means so as to allow product to be retained by each of said retaining members sequentially,* wherein said rectifying means has a hampering portion located forwardly of the path of said product in a moving direction of said retaining members and adapted to press said product in cooperation with one of said retaining members.

13. An apparatus for suspending a product with a material filled in a casing [according to claim 7,] *by means of a plurality of retaining members which are moving, comprising:*

*supplying means for supplying said product in a longitudinal direction thereof;*

*rectifying means located downstream of said supplying means and adapted to guide said product supplied by said supplying means toward conveyor means; and*

*said conveyor means having said retaining members adapted to move toward a path of said product in such a manner that a plane of movement of said retaining members at a position of intersection with the path of said product includes a horizontal component,*

*wherein said rectifying means is provided with a space for rendering a form of passage of said product through said rectifying means changeable with respect to said rectifying means so as to allow said product to be retained by each of said retaining members sequentially,* wherein said rectifying means is formed by a bottom guide surface for receiving said product in a slidable state and by a side surface extending upwardly from a side of each of said bottom guide surface located on a moving-direction side of said retaining members.

15. An apparatus for suspending a product with a material filled in a casing [according to claim 7,] *by means of a plurality of retaining members which are moving, comprising:*

*supplying means for supplying said product in a longitudinal direction thereof;*

*rectifying means located downstream of said supplying means and adapted to guide said product supplied by said supplying means toward conveyor means; and*

*said conveyor means having said retaining members adapted to move toward a path of said product in such a manner that a plane of movement of said retaining members at a position of intersection with the path of said product includes a horizontal component,*

*wherein said rectifying means is provided with a space for rendering a form of passage of said product through said rectifying means changeable with respect to said rectifying means so as to allow said product to be retained by each of said retaining members sequentially,* wherein said rectifying means is provided with a resilient members for pressing said product in cooperation with each of said retaining members.

16. An apparatus for suspending a product with a material filled in a casing [according to claim 7,] by means of a plurality of retaining members which are moving, comprising:

supplying means for supplying said product in a longitudinal direction thereof;

rectifying means located downstream of said supplying means and adapted to guide said product supplied by said supplying means toward conveyor means; and said conveyor means having said retaining members adapted to move toward a path of said product in such a manner that a plane of movement of said retaining members at a position of intersection with the path of said product includes a horizontal component, wherein said rectifying means is provided with a space for rendering a form of passage of said product through said rectifying means changeable with respect to said rectifying means so as to allow said product to be retained by each of said retaining members sequentially, wherein a distance between a lower end of said rectifying means in a supplying direction and said retaining member for retaining said product is shorter than a length of each link forming said product.

17. An apparatus for suspending a product with a material filled in a casing [according to claim 7,] by means of a plurality of retaining members which are moving, comprising:

supplying means for supplying said product in a longitudinal direction thereof;

rectifying means located downstream of said supplying means and adapted to guide said product supplied by said supplying means toward conveyor means; and said conveyor means having said retaining members adapted to move toward a path of said product in such a manner that a plane of movement of said retaining members at a position of intersection with the path of said product includes a horizontal component, wherein said rectifying means is provided with a space for rendering a form of passage of said product through said rectifying means changeable with respect to said rectifying means so as to allow said product to be retained by each of said retaining members sequentially, wherein a distance between a lower end of said rectifying means in a supplying direction and said retaining member for retaining said product is longer than a length of each link forming said product.

19. A method for suspending a product with a material filled in a casing, by means of a plurality of retaining members which are moving, comprising the steps of:

supplying said product in a longitudinal direction thereof via rectifying means;

causing said retaining members to move toward a path of said product in such a manner that a plane of movement of said retaining members at a position of intersection with the path of said product includes a horizontal component;

guiding said product by means of said rectifying means in such a manner that a form of passage of said product is changeable with respect to said rectifying means so as to allow said product to be retained by each of said retaining members; and sequentially exerting action upon said product in such a manner as to return the form of passage thereof which has changed with respect to said rectifying means, to the form persisting prior to said change, in preparation for retention by an ensuing retaining member;

wherein said rectifying means is stationary.

20. An apparatus for suspending a product with a material filled in a casing, by means of a plurality of retaining members which are moving, comprising:

supplying means for supplying said product in a longitudinal direction thereof;

rectifying means located downstream of said supplying means and adapted to guide said product supplied by said supplying means toward conveyor means; and said conveyor means having said retaining members adapted to move toward a path of said product in such a manner that a plane of movement of said retaining members at a position of intersection with the path of said product includes a horizontal component, wherein said rectifying means is provided with a space for rendering a form of passage of said product through said rectifying means changeable with respect to said rectifying means so as to allow said product to be retained by each of said retaining members sequentially;

wherein said rectifying means is stationary.

21. A method for suspending a product with a material filled in a casing, by means of a plurality of retaining members which are moving, comprising the steps of:

supplying said product in a longitudinal direction thereof;

causing said retaining members to move toward a path of said product in such a manner that a plane of movement of said retaining members at a position of intersection with the path of said product includes a horizontal component; and causing each of said retaining members sequentially and a hampering member located forwardly of the path of said product in a moving direction of said retaining members to coact in applying a braking force to said product in such a manner that a portion of said product located upstream of a portion where said product engages with each of said retaining members passes to a trailing side of each of said retaining members;

wherein prior to application of said braking force, said product located upstream of said portion where said product engages with each of said retaining members is located in a vertical plane.

22. A method according to claim 21, wherein said portion of said product which passes to said trailing side of each of said retaining members is located at least partially outside of said vertical plane.

23. A method for suspending a product with a material filled in a casing, by means of a plurality of retaining members which are moving, comprising the steps of:

supplying said product in a longitudinal direction thereof via rectifying means;

causing said retaining members to move toward a path of said product in such a manner that a plane of movement of said retaining members at a position of intersection with the path of said product includes a horizontal component;

guiding said product by means of said rectifying means in such a manner that a form of passage of said product is changeable with respect to said rectifying menas so as to allow said product to be retained by each of said retaining members; and sequentially exerting action upon said product in such a manner as to return the form of passage thereof which has changed with respect to said rectifying means, to the form persisting prior to said change, in preparation for retention by an ensuing retaining member;

wherein said form of passage of said product persisting prior to said change is located in a vertical plane.

24. A method according to claim 23, wherein said form of passage of said product which has changed with respect to said rectifying means is located at least partially outside of said vertical plane.

25. An apparatus for suspending a product with a material filled in a casing, by means of a plurality of retaining members which are moving, comprising:

supplying means for supplying said product in a longitudinal direction thereof;

rectifying means located downstream of said supplying means and adapted to guide said product supplied by said supplying means toward conveyor means; and said conveyor means having said retaining members adapted to move toward a path of said product in such a manner that a plane of movement of said retaining members at a position of intersection with the path of said product includes a horizontal component, wherein said rectifying means is provided with a space for rendering a form of passage of said product through said rectifying means changeable with respect to said rectifying means so as to allow said product to be retained by each of said retaining members sequentially;

wherein said longitudinal direction is located in a vertical plane.

26. An apparatus according to claim 25, wherein said form of passage of said product is changeable from a location in said vertical plane to a location at least partially outside of said vertical plane.

27. An apparatus for suspending a product with a material filled in a casing, by means of a plurality of retaining members which are moving, comprising:

supplying means for supplying said product in a longitudinal direction thereof;

rectifying means located downstream of said supplying means and adapted to guide said product supplied by said supplying means toward conveyor means; and said conveyor means having said retaining members adapted to move toward a path of said product in such a manner that a plane of movement of said retaining members at a position of intersection with the path of said product includes a horizontal component, wherein said rectifying means is provided with a space for rendering a form of passage of said product through said rectifying means changeable with respect to said rectifying means so as to allow said product to be retained by each of said retaining members sequentially;

wherein said rectifying means is stationary, said rectifying means guiding said product in a slidable state toward the conveyor means and having a downwardly inclined section which is inclined toward said conveyor means, said rectifying means rendering said form of passage of said product through said rectifying means changeable in a direction opposite to a moving direction of said retaining members at said position of intersection with the path of said product, said inclined section being open at a side opposite to said moving direction of said retaining members at said position of intersection with the path of said product.

* * * * *